US 11,150,853 B2

(12) United States Patent
Shikama et al.

(10) Patent No.: US 11,150,853 B2
(45) Date of Patent: Oct. 19, 2021

(54) APPARATUS AND METHOD FOR SWITCHING CONNECTION DESTINATION BETWEEN EXTERNAL DEVICES

(71) Applicants: Takeshi Shikama, Kanagawa (JP); Hiroki Tanaka, Kanagawa (JP); Ryosuke Takeuchi, Kanagawa (JP)

(72) Inventors: Takeshi Shikama, Kanagawa (JP); Hiroki Tanaka, Kanagawa (JP); Ryosuke Takeuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/773,999

(22) Filed: Jan. 28, 2020

(65) Prior Publication Data

US 2020/0241822 A1 Jul. 30, 2020

(30) Foreign Application Priority Data

Jan. 30, 2019 (JP) .............................. JP2019-014679

(51) Int. Cl.
*G06F 3/12* (2006.01)
*H04W 84/12* (2009.01)
(Continued)

(52) U.S. Cl.
CPC .......... *G06F 3/1292* (2013.01); *G06F 3/1203* (2013.01); *G06F 3/1236* (2013.01);
(Continued)

(58) Field of Classification Search
None
See application file for complete search history.

(56) References Cited

U.S. PATENT DOCUMENTS

2012/0061909 A1 3/2012 Shikama et al.
2012/0229866 A1 9/2012 Miyazaki et al.
(Continued)

FOREIGN PATENT DOCUMENTS

JP 2009-205637 9/2009
JP 2010-226698 10/2010

OTHER PUBLICATIONS

U.S. Appl. No. 16/508,949, filed Jul. 11, 2019, Takeshi Shikama, et al.

*Primary Examiner* — Thomas D Lee
(74) *Attorney, Agent, or Firm* — Xsensus LLP

(57) ABSTRACT

A communication apparatus for data communication with a plurality of external devices includes a communication interface and processing circuitry. The communication interface is configured to perform wired communication and wireless communication with the plurality of external devices. The processing circuitry is configured to determine whether the plurality of external devices is connected via the wired communication or the wireless communication, and switch a connection destination from one external device to another external device of the plurality of external devices when the one external device is connected via one of the wired communication and the wireless communication and the processing circuitry receives a connection request from said another external device via the other of the wired communication and the wireless communication.

17 Claims, 17 Drawing Sheets

(51) Int. Cl.
 *H04W 4/80* (2018.01)
 *H04N 1/00* (2006.01)
(52) U.S. Cl.
 CPC .......... *H04N 1/00307* (2013.01); *H04W 4/80* (2018.02); *H04W 84/12* (2013.01); *H04N 2201/0055* (2013.01); *H04N 2201/0094* (2013.01)

(56) References Cited

U.S. PATENT DOCUMENTS

| | | |
|---|---|---|
| 2012/0262750 A1 | 10/2012 | Kinoshita et al. |
| 2013/0063536 A1 | 3/2013 | Komai et al. |
| 2013/0084109 A1 | 4/2013 | Shikama et al. |
| 2014/0139607 A1 | 5/2014 | Hayashi et al. |
| 2015/0150000 A1* | 5/2015 | Anumalasetty ..... G06F 9/45558 718/1 |
| 2018/0048803 A1* | 2/2018 | Morita .................... H04W 4/80 |
| 2019/0283408 A1 | 9/2019 | Tanaka et al. |
| 2020/0383174 A1* | 12/2020 | Ogiwara ............... H04W 88/06 |

* cited by examiner

APPARATUS AND METHOD FOR SWITCHING CONNECTION DESTINATION BETWEEN EXTERNAL DEVICES

CROSS-REFERENCE TO RELATED APPLICATIONS

This patent application is based on and claims priority pursuant to 35 U.S.C. § 119(a) to Japanese Patent Application No. 2019-014679, filed on Jan. 30, 2019, in the Japan Patent Office, the entire disclosure of which is hereby incorporated by reference herein.

BACKGROUND

Technical Field

Aspects of the present disclosure relate to a communication apparatus, a communication method, and a recording medium.

Discussion of the Background Art

In recent years, an image forming apparatus used for outputting digitized information has become an indispensable device. With the miniaturization and portability of information processing apparatuses (image data output devices) that output image data using this image forming apparatus, there has been increasing the demand for miniaturization and portability of the image forming apparatuses. Then, handheld mobile printers as small-size image forming apparatuses without a sheet conveyance mechanism are being put to practical use.

When a handheld mobile printer performs an image forming operation based on image data output from an image data output device, manual scanning by a user is needed. Input of image data from the image data output device to the handheld mobile printer is performed via a communication interface.

Generally, a communication interface (I/F) for a portable device to communicate with another device is classified into a wired connection type and a wireless connection type. Therefore, the handheld mobile printer also has both wireless connection type and wired connection type communication interfaces as communication interfaces used for connection with the image data output device.

SUMMARY

In an aspect of the present disclosure, there is provided a communication apparatus for data communication with a plurality of external devices. The communication apparatus includes a communication interface and processing circuitry. The communication interface is configured to perform wired communication and wireless communication with the plurality of external devices. The processing circuitry is configured to determine whether the plurality of external devices is connected via the wired communication or the wireless communication, and switch a connection destination from one external device to another external device of the plurality of external devices when the one external device is connected via one of the wired communication and the wireless communication and the processing circuitry receives a connection request from said another external device via the other of the wired communication and the wireless communication.

In another aspect of the present disclosure, there is provided a communication method for performing data communication with a plurality of external devices via wired communication or wireless communication. The method includes determining whether the plurality of external devices is connected via the wired communication or the wireless communication, and switching a connection destination from one external device to another external device of the plurality of external devices when the one external device is connected via one of the wired communication and the wireless communication and a connection request from said another external device is received via the other of the wired communication and the wireless communication.

In still another aspect of the present disclosure, a non-transitory storage medium storing a plurality of instructions which, when executed by one or more processors, cause the processors to perform a communication method for performing data communication in connection with a plurality of external devices. The method includes performing wired communication with the plurality of external devices, performing wireless communication with the plurality of external devices, determining whether the plurality of external devices is connected via the wired communication or the wireless communication, and switching a connection destination from one external device to another external device of the plurality of external devices when the one external device is connected via one of the wired communication and the wireless communication and a connection request from said another external device is received via the other of the wired communication and the wireless communication.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
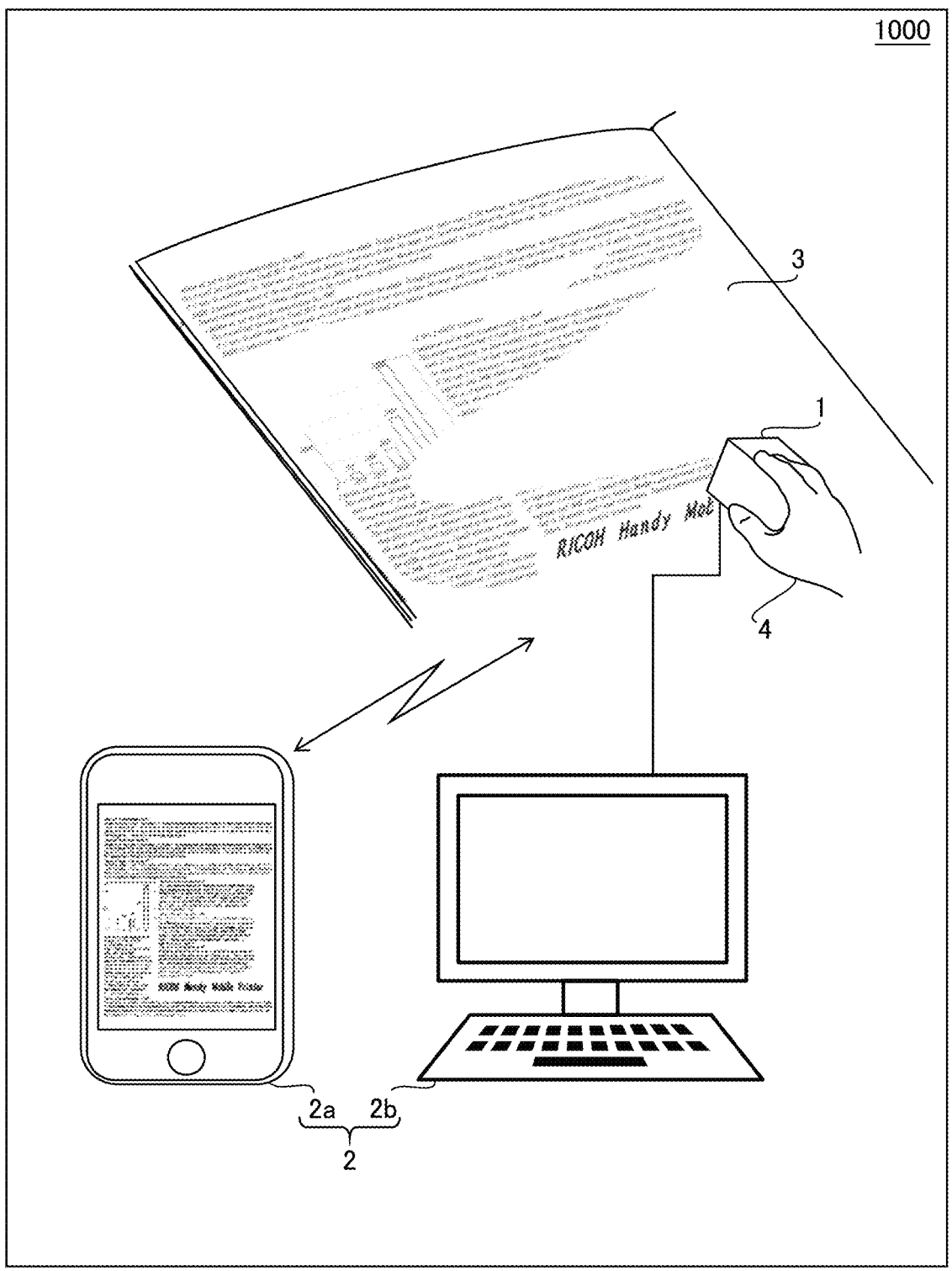
FIG. 1 is a schematic view illustrating a state of image formation performed using a handheld printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments will be described with reference to the drawings. For clarity of the description, omission and simplification are made appropriately in description and drawings hereinafter. In the drawings, constituent elements having the same configurations or functions and the corresponding parts are denoted by the same reference signs, and the description thereof is omitted.

Embodiment of Image Forming System 1000

A communication apparatus according to an embodiment of the present disclosure is described below with reference to drawings. The communication apparatus according to an embodiment of the present disclosure is applicable to a portable image forming apparatus such as a handheld mobile printer. Therefore, in the following description, an example of a "handheld printer 1" that is one type of a portable image forming apparatus and needs manual scanning by a user at the time of image forming output is described as the communication apparatus according to an embodiment of the present disclosure.

FIG. 1 is a schematic view of an image forming process (image forming operation) performed using a handheld printer 1 in an image forming system 1000 that includes a handheld printer 1 and an image data transmission device 2 as an information output device according to an embodiment of the present disclosure. The handheld printer 1 establishes a wireless or wired communication connection state with the image data transmission device 2 before performing image formation processing based on image data received from the image data transmission device 2.

The image data transmission device 2 includes a wireless terminal 2a such as a smartphone connected to the handheld printer 1 via a wireless connection interface (hereinafter, referred to as "I/F") and a wired terminal 2b such as a personal computer (PC) connected to the handheld printer 1 via a wired connection I/F. Hereinafter, in the present specification, when a description is given based on the information output device that does not limit the type of the communication I/F, the "image data transmission device 2" is simply referred to and the wireless terminal 2a and the wired terminal 2b are not distinguished in the description.

As illustrated in FIG. 1, when the handheld printer 1 receives image data from the image data transmission device 2 and forms an image on a recording medium 3, a user 4 manually scan the recording medium 3 with the handheld printer 1. The handheld printer 1 discharges droplets containing a colorant such as ink to the recording medium 3 according to its own position. As a result, the image formation output is executed based on the image data received from the image data transmission device 2 using the handheld printer 1.

In the present embodiment, the recording medium 3 is a member having a flat portion such as a notebook or a copy sheet as illustrated in FIG. 1. For example, the recording medium 3 is a standard size paper. Note that the material and shape of a member applicable as the recording medium 3 are not particularly limited as long as the member can be manually scanned by the handheld printer 1. Therefore, the recording medium 3 may be any medium that can detect the position of the handheld printer 1 that moves with manual scanning, and may be a medium that includes a curved surface.

Figure 2:
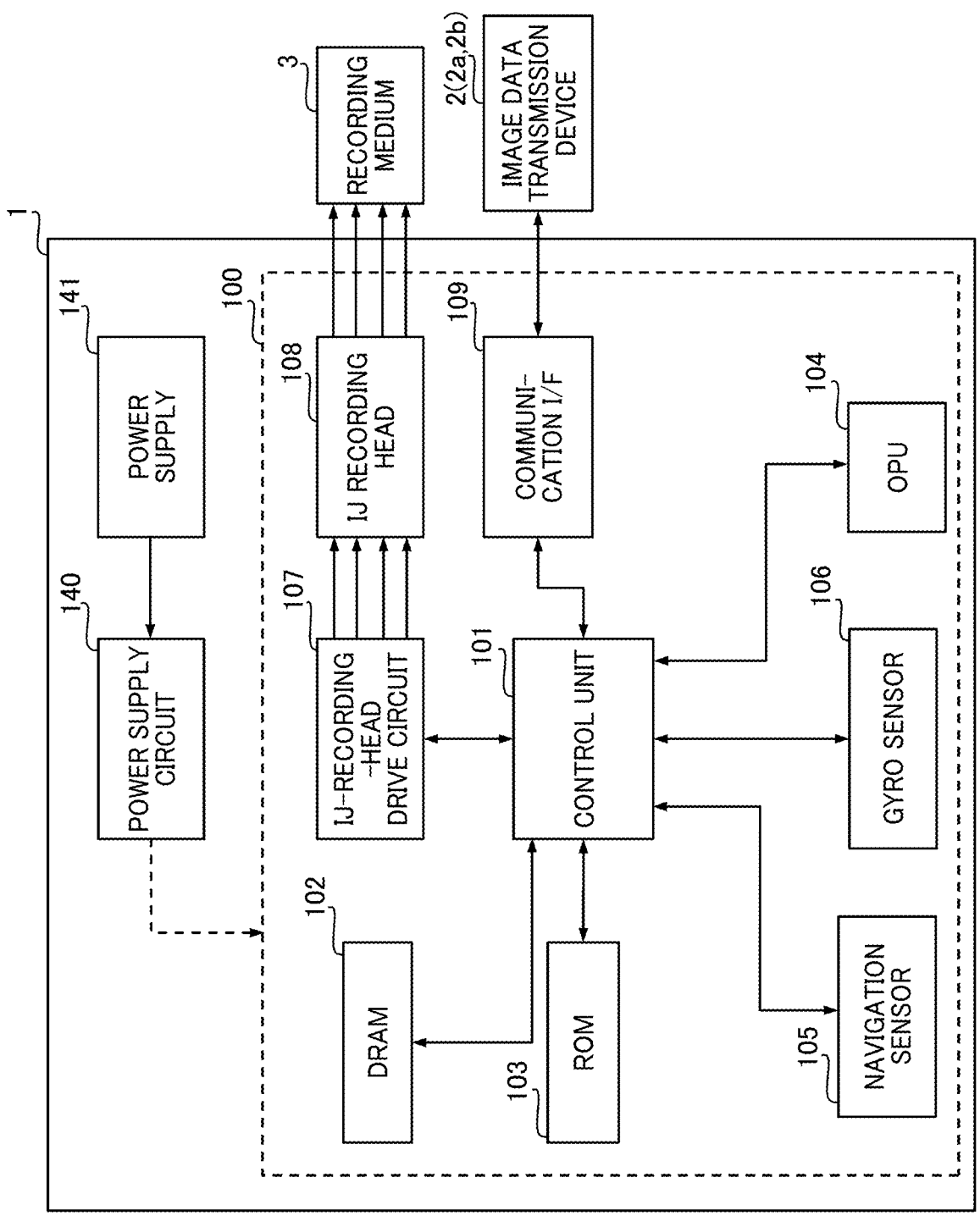
FIG. 2 is a block diagram of a hardware configuration of the handheld printer according to an embodiment of the present disclosure.

Next, a hardware configuration of the handheld printer 1 is described with reference to FIG. 2. As illustrated in FIG. 2, the handheld printer 1 includes a control unit 101, a power supply circuit 140, a power supply 141, a dynamic random access memory (DRAM) 102, a read only memory (ROM) 103, an operation panel unit (OPU) 104, a navigation sensor 105, a gyro sensor 106, an inkjet (IJ)-recording-head drive circuit 107, an IJ recording head 108, and a communication I/F 109.

The control unit 101 controls the operation of the entire handheld printer 1. The functional configuration of the control unit 101 is described later. The control unit 101 is electrically connected to the DRAM 102, the ROM 103, the OPU 104, the navigation sensor 105, the gyro sensor 106, the IJ-recording-head drive circuit 107, and the communication I/F 109.

As the power supply 141 can be used, for example, a dry battery, a rechargeable battery, a solar battery, or a fuel battery. The power supply circuit 140 is connected to each device surrounded by a broken line 100 in FIG. 2 by an electric wire, and distributes the power supplied by the power supply 141 to each device of the handheld printer 1.

The power supply circuit 140 raises or lowers the voltage of the power supply 141 to a voltage suitable for each device when distributing power to each device of the handheld printer 1. When a rechargeable-and-dischargeable battery is used as the power supply 141, the power supply 141 has a function of charging the battery. For example, the power supply circuit 140 detects connection of a commercial power supply to the handheld printer 1 and connects the power supply 141 to a circuit for charging the power supply 141.

The DRAM 102 is a volatile storage medium to store image data received from the image data transmission device 2 via the communication I/F 109 or record firmware expanded from the ROM 103. The DRAM 102 is used as a work memory when the central processing unit (CPU) 111 (see FIG. 3) of the control unit 101 executes the firmware.

The ROM 103 is a non-volatile storage medium to store various programs such as firmware for performing hardware control of the handheld printer 1 executed by the control unit 101. The ROM 103 also stores, for example, drive waveform data for causing the IJ recording head 108 to perform an discharge operation and initial setting data of the handheld printer 1.

The OPU 104 is an operation display unit that serves as an operation unit to receive an operation from the user 4 and a display unit to display the state of the handheld printer 1, and includes a light emitting diode (LED), a switch (for example, an LED switch and a power switch), and the like. As the OPU 104 may be used, for example, a display mechanism, such as a liquid crystal panel or a touch panel display, or a sound generation mechanism that generates sound.

The navigation sensor 105 is a sensor to detect and output a moving amount, a rotation amount, an acceleration, and the like of the position of the handheld printer 1 or the IJ recording head 108 for each sampling cycle.

As a configuration of the navigation sensor 105, for example, an optical distance measuring sensor is used that includes a combination of a light source, such as a LED or a laser, and an image pickup device to pick up an image on the recording medium 3. Note that an acceleration sensor may be used as the configuration of the navigation sensor 105.

The optical distance measuring sensor constituting the navigation sensor 105 detects edges, which are change points of color or brightness, on the surface of the recording medium 3 in accordance with the scanning of the handheld printer 1 on the recording medium 3. A detection signal of the edge with the navigation sensor 105 is input to the control unit 101. The control unit 101 calculates the moving amount of the handheld printer 1 based on the distance between the edges.

The gyro sensor 106 can detect angular velocities with the movement of the handheld printer 1 and integrates the detected angular velocities to detect a rotation angle θ. The posture (inclination) of the handheld printer 1 can be determined based on the detection results of the gyro sensor 106. Such a configuration can notify the user 4 that the handheld printer 1 is in a state of hindering normal image formation, such as a state in which the handheld printer 1 floats from the recording medium 3 during scanning of an image formation output or a state in which the discharge direction of droplets from the IJ recording head 108 is inclined relative to the recording medium 3. Further, when the navigation sensor 105 includes an acceleration sensor, the orientation and inclination of the body of the handheld printer 1 can be more accurately detected by combining the detection result of the navigation sensor 105 with the detection result of the gyro sensor 106. The navigation sensor 105 and the gyro sensor 106 function as a moving amount detector.

The IJ-recording-head drive circuit 107 generates a drive voltage for driving the IJ recording head 108 based on the drive waveform data output from the control unit 101. The IJ-recording-head drive circuit 107 generates a drive voltage according to the size of ink droplets discharged from the IJ recording head 108.

The IJ recording head 108 is a droplet discharge device that discharges ink (droplets). In the present embodiment, a configuration capable of discharging four color inks of cyan (C), magenta (M), yellow (Y), and black (K) is exemplified. In some embodiments, a configuration of discharging a single color ink or a configuration of discharging five or more colors of ink may be used. The IJ recording head 108 discharges ink toward the recording medium 3 by the drive voltage output from the IJ-recording-head drive circuit 107.

As a driving method of the IJ recording head 108 can be used, for example, a piezo method using a piezoelectric element such as a piezo element or a thermal method using bubbles generated by heating ink to discharge ink.

In the present embodiment, it is assumed that various information used for determining the moving direction and the moving amount of the handheld printer 1 with the navigation sensor 105 are stored in a storage medium, such as the ROM 103, in advance. Here, the "various information" refers to, for example, the distance from the navigation sensor 105 to an end of the IJ recording head 108 and the distance between a nozzle arranged at a position closest to an end of the IJ recording head 108 and the end of the IJ recording head 108. Various information further includes a distance between nozzles arranged in the IJ recording head 108 and the like.

The communication I/F 109 establishes a connection for performing data communication with an external device through communication conforming to various wireless communication standards, for example, a wireless local area network (LAN) or near field communication (NFC), or wired communication such as a wired LAN or universal serial bus (USB). Via the communication I/F, the handheld printer 1 communicates with external devices, such as the image data transmission device 2 and other information processing devices. Note that the communication I/F 109 has a configuration capable of simultaneously establishing a plurality of connections and can simultaneously establish a data communication enabled state with a plurality of external devices. Therefore, the communication I/F 109 constitutes a wired communication device and a wireless communication device.

The communication I/F 109 also constitutes at least part of a switching device to switch a connection destination capable of data communication from one external device to another external device when a connection is made from one external device to the other external device is connected to the handheld printer 1 with the one external device being connected to the handheld printer 1. For example, when a connection that allows data communication from the wired terminal 2b is established in a connection state that allows data communication with the wireless terminal 2a, the communication I/F 109 switches a communication partner of the data communication from the wireless terminal 2a to the wired terminal 2b. Then, to the wireless terminal 2a whose connection destination has been switched, the communication I/F 109 transmits a communication state change notification informing that data communication is not permitted (a state in which transmission of image data is not permitted). The communication I/F 109 also constitutes at least part if a notification transmission device to transmit the communication state change notification.

Note that "switching the communication partner" means that the wireless terminal 2a, which was the communication partner until communication with the wired terminal 2b becomes possible, is removed from the communication partner, that is, switched into a state in which the data transmitted from the wireless terminal 2a is not received. Alternatively, "switching the communication partner" means that the wireless terminal 2a, which was the communication partner until the communication with the wired terminal 2b becomes possible, is controlled to make a transition to a state in which data communication to the handheld printer 1 is not permitted.

The communication state change notification includes, in addition to a connection stop notification notifying that the data communication is not permitted as described above, a connection restart notification indicating that data communication is restarted when the connection destination is switched back to the wireless terminal 2a.

Internal Function Block of Control Unit 101

Figure 3:
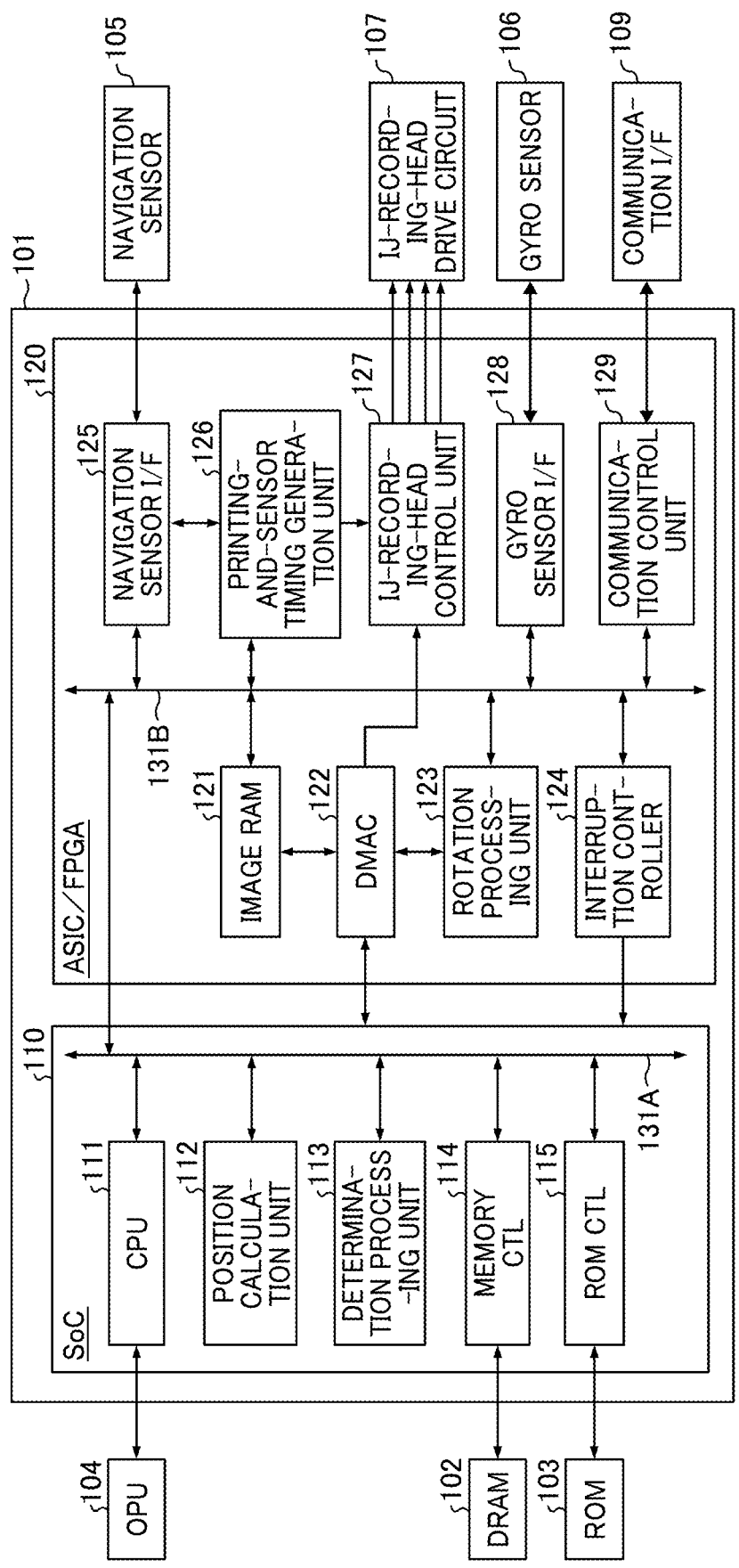
FIG. 3 is a functional block diagram of a configuration of a control unit according to an embodiment of the present disclosure.

Next, an internal configuration of the control unit 101 according to the present embodiment is described with reference to FIG. 3. FIG. 3 is a functional block diagram of a configuration of the control unit 101 according to the present embodiment. The control unit 101 according to the present embodiment includes a system on chip (SoC) 110 and an application specific integrated circuit (ASIC)/field programmable gate array (FPGA) 120. Communication between the SoC 110 and the ASIC/FPGA 120 is performed via buses 131A and 131B.

Note that the ASIC/FPGA 120 may be designed using any of an ASIC implementation technology and an FPGA implementation technology. The ASIC/FPGA 120 may be configured to use a implementation technology other than the ASIC and the FPGA. The SoC 110 and the ASIC/FPGA 120 may be mounted on one chip or substrate instead of separate chips, or on three or more chips or substrates.

The SoC 110 includes a CPU 111, a position calculation unit 112, a determination processing unit 113, a memory controller (CTL) 114, and a ROM CTL 115 connected via the bus 131A. The SoC 110 may be configured to include functions other than the above-described functions.

The ASIC/FPGA 120 includes an image RAM 121, a direct memory access controller (DMAC) 122, a rotation processing unit 123, an interruption controller 124, a navigation sensor I/F 125, a printing-and-sensor timing generation unit 126, a IJ-recording-head control unit 127, a gyro sensor I/F 128, and a communication control unit 129 that are connected via the bus 131B. The ASIC/FPGA 120 may be configured to include functions other than the above-described functions.

The CPU 111 executes, for example, firmware developed from the ROM 103 to the DRAM 102 to control the operations of the position calculation unit 112, the determination processing unit 113, the memory CTL 114, and the ROM CTL 115 in the SoC 110.

The CPU 111 further controls the operations of the image RAM 121, the DMAC 122, the rotation processing unit 123, the interruption controller 124, the navigation sensor I/F 125, the printing-and-sensor timing generation unit 126, the IJ-recording-head control unit 127, the gyro sensor I/F 128, and the communication control unit 129 in the ASIC/FPGA 120. The CPU 111 controls the above-described components to achieve the functions of the components constituting the handheld printer 1.

The position calculation unit 112 calculates the position of the handheld printer 1 based on the amount of movement of the handheld printer 1 input from the navigation sensor 105 and the gyro sensor 106 at each sampling cycle. The position of the handheld printer 1 is strictly the position of a nozzle of the IJ recording head 108. However, if the position at which the navigation sensor 105 exists is known, the position of the nozzle can be calculated.

The position calculation unit 112 calculates the position of the navigation sensor 105 based on a predetermined origin, for example, the initial position of the handheld printer 1 at the start of an image formation output. The position calculation unit 112 estimates the moving speed and the moving direction of the handheld printer 1 in the next sampling cycle based on the difference between the past calculation result of the position of the navigation sensor 105 and the newest calculation result of the position of the navigation sensor 105.

The position calculation unit 112 may be configured to predict the position of the navigation sensor 105 in the next sampling cycle based on the estimation result of the moving speed and the moving direction of the handheld printer 1.

The determination processing unit 113 determines whether the handheld printer 1 is scanning an image area 300 based on the calculation result of the position of the handheld printer 1 by the position calculation unit 112 and image area information received from the image data transmission device 2. The determination processing unit 113 receives a connection status of the image data transmission device 2 in the communication I/F 109 from the communication control unit 129 and determines the status (wireless communication or wireless communication) of the external device connected to the handheld printer 1. The determination processing unit 113 constitutes a connection determination unit.

As described above, the position of the handheld printer 1 is strictly the position of a nozzle of the IJ recording head 108. However, if the position at which the navigation sensor 105 exists is known, the position of the nozzle can be calculated. Therefore, the determination processing unit 113 may be configured to calculate the positions of nozzles arranged on the IJ recording head 108 from the calculation result of the position of the handheld printer 1 and determine whether the positions of nozzles are at positions at which the image area 300 can be scanned.

The "image area information" is information defined based on image data selected by the user 4 as an object of image formation output by the handheld printer 1. The image area information is also information indicating an area on the recording medium 3 in which the image data selected as the object of image formation output is formed.

The memory CTL 114 is an I/F with the DRAM 102 and requests data from the DRAM 102. The memory CTL 114 transfers firmware acquired from the DRAM 102 to the CPU 111 and transfers image data obtained from the DRAM 102 to the ASIC/FPGA 120.

The ROM CTL 115 is an I/F with the ROM 103 and requests data from the ROM 103. The ROM CTL 115 transfers the data acquired from the ROM 103 to the CPU 111 or the ASIC/FPGA 120.

The image RAM 121 temporarily stores the image data acquired by the DMAC 122. That is, image data is buffered in the image RAM 121, and a peripheral image corresponding to the position of the handheld printer 1 is read from the image data buffered in the image RAM 121.

The rotation processing unit 123 performs rotation processing on the image data acquired by the DMAC 122 according to the IJ recording head 108 and the positions of nozzles in the IJ recording head 108. The DMAC 122 outputs the image data having been subjected to the rotation processing to the IJ-recording-head control unit 127.

The rotation processing unit 123 acquires, for example, the rotation angle θ calculated by the position calculation unit 112 when the position calculation unit 112 calculates the position of the handheld printer 1, and performs rotation processing on the peripheral image using the rotation angle θ. Note that the rotation angle θ used here is an angle at which, when staring an image formation output, the handheld printer 1 is inclined on the plane of the recording medium 3 with respect to the posture in which the handheld printer 1 performs the normal image formation on the recording medium 3.

The interruption controller 124 detects that the navigation sensor I/F 125 has completed communication with the navigation sensor 105 and that the gyro sensor I/F 128 has completed communication with the gyro sensor 106, and outputs, to the SoC 110, an interrupt signal notifying the completion of the communication. The CPU 111 acquires the moving amount of the navigation sensor 105 stored in an internal register of the navigation sensor I/F 125 based on the interruption signal. The interruption controller 124 also has a function of notifying a status such as an error.

The printing-and-sensor timing generation unit 126 notifies the navigation sensor I/F 125 of the timing at which the detection signal of the navigation sensor 105 is read, and also notifies the IJ-recording-head control unit 127 of the drive timing. When it is determined that the nozzle position has reached a target discharge position at which ink should be discharged, the IJ-recording-head control unit 127 discharges ink to the recording medium 3.

The communication control unit 129 detects that the wireless terminal 2a or the wired terminal 2b is connected to the communication I/F 109, and notifies the determination processing unit 113 of the connection state. In addition, the communication control unit 129 notifies the connected image data transmission device 2 of an "offline notification" and an "online notification" that are connection state change notifications notified from the CPU 111. The communication control unit 129 controls communication with the wireless terminal 2a or the wired terminal 2b connected to the communication I/F 109.

When one image data transmission device 2 has previously established a state in which data communication is possible with the handheld printer 1, a data communication establishment request may be issued later from another image data transmission device 2. In such a case, the offline notification is transmitted to the image data transmission device 2. The offline notification corresponds to the connection stop notification.

Further, when one image data transmission device 2 has received the connection stop notification and the other image data transmission device 2 having issued the data communication establishment request is disconnected later, the online notification is transmitted to the one image data transmission device 2 that has received the connection stop notification. The online notification corresponds to the connection restart notification.

More specifically, the offline notification is information for notifying the wireless terminal 2a that the wired terminal 2b has been connected to the communication I/F 109 when the wireless terminal 2a is connected to the communication I/F 109 and the communication I/F 109 is ready to receive image data from the wireless terminal 2a. The online notification is information for notifying the wireless terminal 2a that the communication I/F 109 is ready to receive image data from the wireless terminal 2a when the wired terminal 2b connected later is disconnected (when the connection with the communication I/F 109 is released, when a non-communication state continues for a certain period of time, or the like).

Functional Configuration of Determination Processing Unit 113

Figure 4:
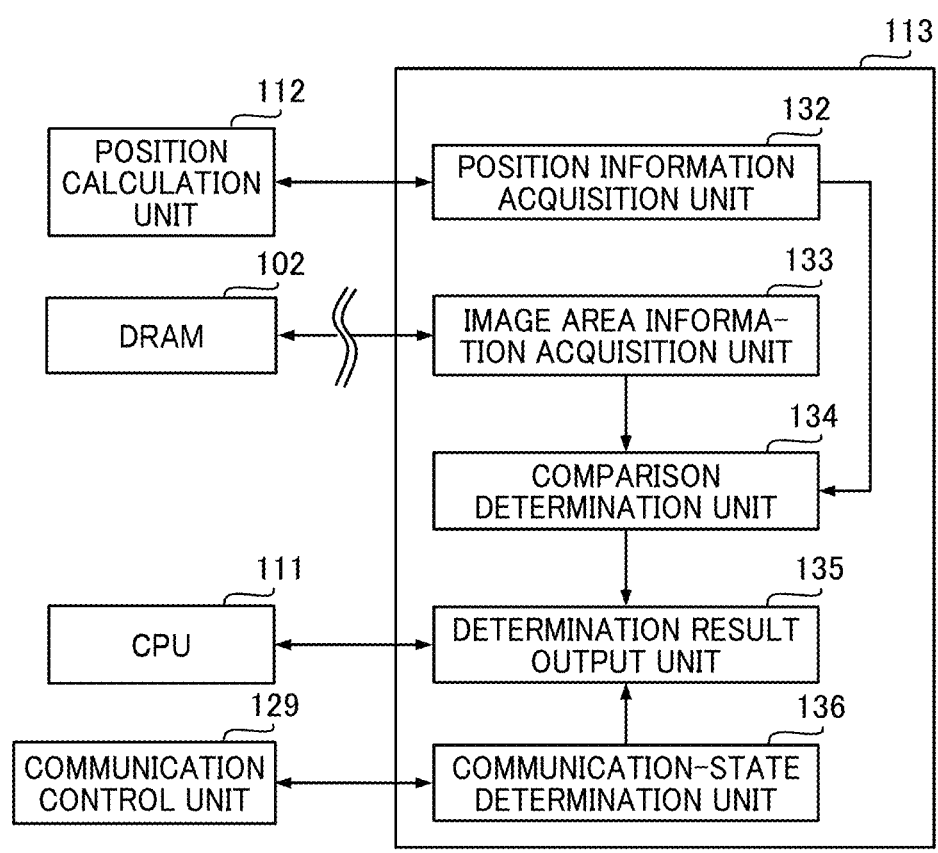
FIG. 4 is a functional block diagram of an internal configuration of a determination processing unit according to an embodiment of the present disclosure.

Next, a detailed configuration of the determination processing unit 113 according to the present embodiment is described with reference to FIG. 4. FIG. 4 is a functional block diagram of an internal configuration of the determination processing unit 113. The determination processing unit 113 includes a position information acquisition unit 132, an image area information acquisition unit 133, a comparison determination unit 134, a determination result output unit 135, and a communication-state determination unit 136.

The position information acquisition unit 132 acquires information on the position of the handheld printer 1 calculated by the position calculation unit 112. Note that the position information acquisition unit 132 may be configured to acquire information on the positions of the nozzles arranged on the IJ recording head 108.

The image area information acquisition unit 133 acquires, from a storage medium such as the DRAM 102, image area information indicating an area on the recording medium 3 in which the image data selected by the user 4 as an object of image formation output of the handheld printer 1 is formed. The image area information is transmitted from the image data transmission device 2 to the handheld printer 1 and stored in a storage medium such as the DRAM 102.

The comparison determination unit 134 determines whether the current scanning position of the handheld printer 1 is within the image area 300 based on the information on the position of the handheld printer 1 and the image area information acquired by the position information acquisition unit 132.

The determination result output unit 135 outputs, to the CPU 111, the determination result of the comparison determination unit 134 regarding whether the current scanning position of the handheld printer 1 is within the image area 300. The determination result output unit 135 outputs the determination result of the communication-state determination unit 136 regarding the connection state of the image data transmission device 2 to the CPU 111. The determination result output unit 135 and the communication-state determination unit 136 constitute a connection determination unit.

The communication-state determination unit 136 determines whether the image data transmission device 2 connected to the handheld printer 1 acquired by the communication control unit 129 is the wireless terminal 2a or the wired terminal 2b, and notifies the determination result output unit 135 of the determination result. That is, the communication-state determination unit 136 determines a connection state of whether the handheld printer 1 is connected to both the wireless terminal 2a and the wired terminal 2b or any one of the wireless terminal 2a and the wired terminal 2b.

The CPU 111 notifies the user 4 of the current scanning position of the handheld printer 1 (out-of-image-area notification) based on the determination result regarding whether the current scanning position of the handheld printer 1 received from the determination result output unit 135 is within the image area 300.

The CPU 111 determines the type of notification to the connected image data transmission device 2 based on the connection information in the handheld printer 1 received from the determination result output unit 135, and transmits the determined connection state change notification (e.g., the offline notification) to the communication control unit 129. The CPU 111 transmits the connection state change notification to the communication control unit 129 and controls a process of switching a connection destination so as to accept data communication from the image data transmission device 2 connected later. The CPU 111 constitutes a switching device.

Note that the CPU 111 performs, for example, notification through control to blink the OPU 104 such as an LED switch or a power switch as the out-of-image-area notification, an offline notification, or an online notification to the user 4. In the case in which the OPU 104 includes a sound generation mechanism, the CPU 111 performs the out-of-image-area notification, the offline notification, or the online notification using a buzzer or voice guidance. Thus, the CPU 111 and the OPU 104 cooperate to function as a determination result notification unit.

The CPU 111 causes an application developed in the DRAM 102 to generate notification information for the out-of-image-area notification and notification information based on the connection state and transmit the generated notification information to the image data transmission device 2. When receiving the notification information, the image data transmission device 2 performs the out-of-image-area notification through display of character information such as "out of the area in which an image is printed" or voice guidance.

When receiving the notification information, the image data transmission device 2 also displays character information, for example, "The device is being used by another device. Please wait until the use is over.", or voice guidance to notify the user 4 of a state in which the image data transmission is not permitted. Thus, the CPU 111 and the image data transmission device 2 cooperate to function as a determination result notification unit.

Hardware Configuration of Image Data Transmission Device 2

Figure 5:
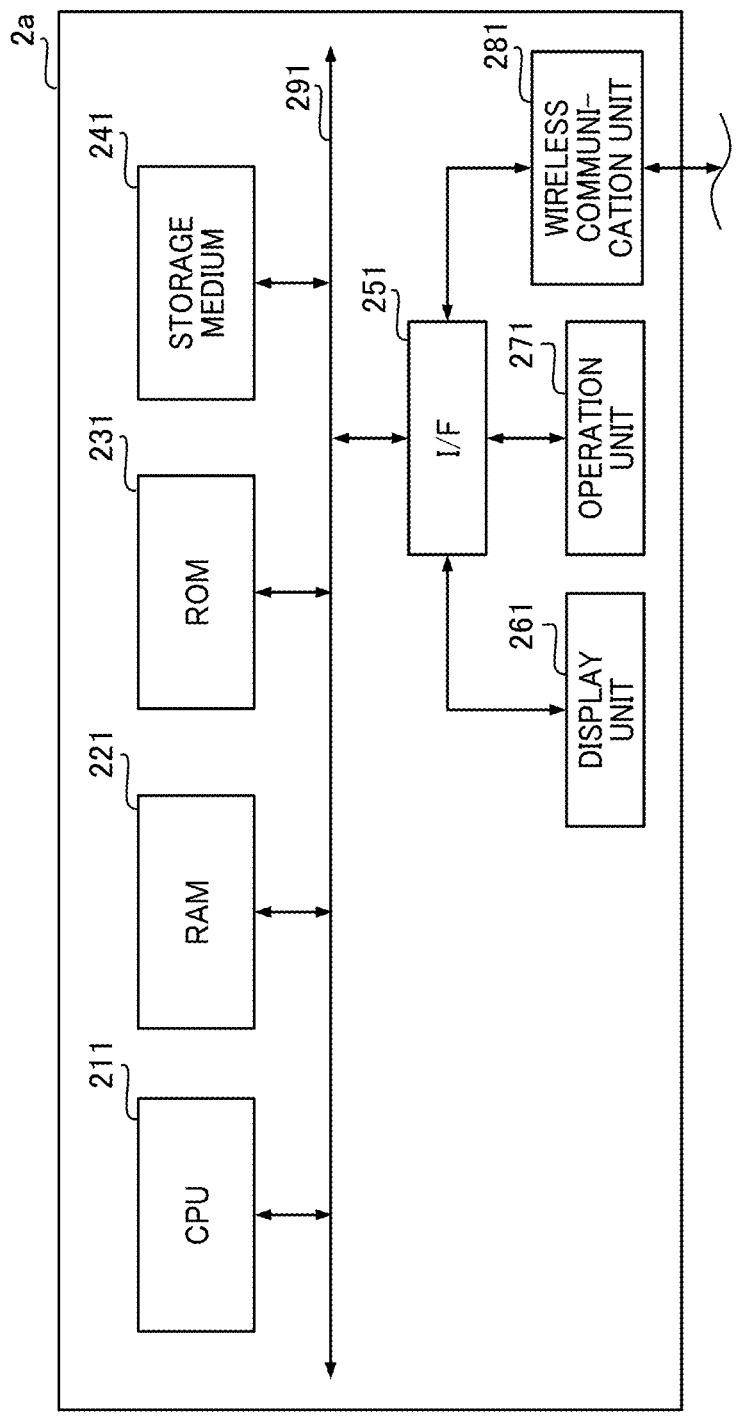
FIG. 5 is a block diagram of a hardware configuration of an image data transmitting terminal according to an embodiment of the present disclosure.

Next, a hardware configuration of the image data transmission device 2 is described. FIG. 5 illustrates a hardware configuration of the wireless terminal 2a. The wireless terminal 2a according to the present embodiment has a similar configuration to an information processing apparatus such as a general PC. That is, the wireless terminal 2a according to the present embodiment is connected to a CPU 211, a RAM 221, a ROM 231, a storage medium 241 such as a hard disk drive (HDD), and an I/F 251 via a bus 291.

In addition to the above-described configuration, the wireless terminal 2a further includes a display unit 261 such as a liquid crystal display (LCD), an operation unit 271 such as a keyboard, and a wireless communication unit 281 that are connected via the I/F 251. The wireless communication unit 281 communicates with the handheld printer 1 and other information processing devices through an NFC or a wireless LAN.

The CPU 211 is an arithmetic unit and controls the operation of the entire image data transmission device 2. The RAM 221 is a volatile storage medium capable of reading and writing information at high speed and is used as a work area (working memory) when the CPU 211 processes information. The ROM 231 is a read only non-volatile storage medium and stores programs such as firmware.

The storage medium 241 is a nonvolatile storage medium, such as an HDD and a solid state drive (SSD), on which information can be read and written, and stores an operating system (OS), various control programs, application programs (hereinafter, applications), and the like. The I/F 251 connects the bus 291 to various hardware, such as the display unit 261 and the operation unit 271, and a network and the like via the wireless communication unit 281 to control such various hardware and the network.

The display unit 261 is a user I/F to allow the user 4 to check the state of the image data transmission device 2 received via the I/F 251. The operation unit 270 includes a keyboard or the like and is a user I/F for the user 4 to input information to the image data transmission device 2. Note that the display unit 261 and the operation unit 271 may be configured as a touch panel using a resistance film system, a surface acoustic wave system, a capacitance system, or the like as an operation principle system.

Figure 7:
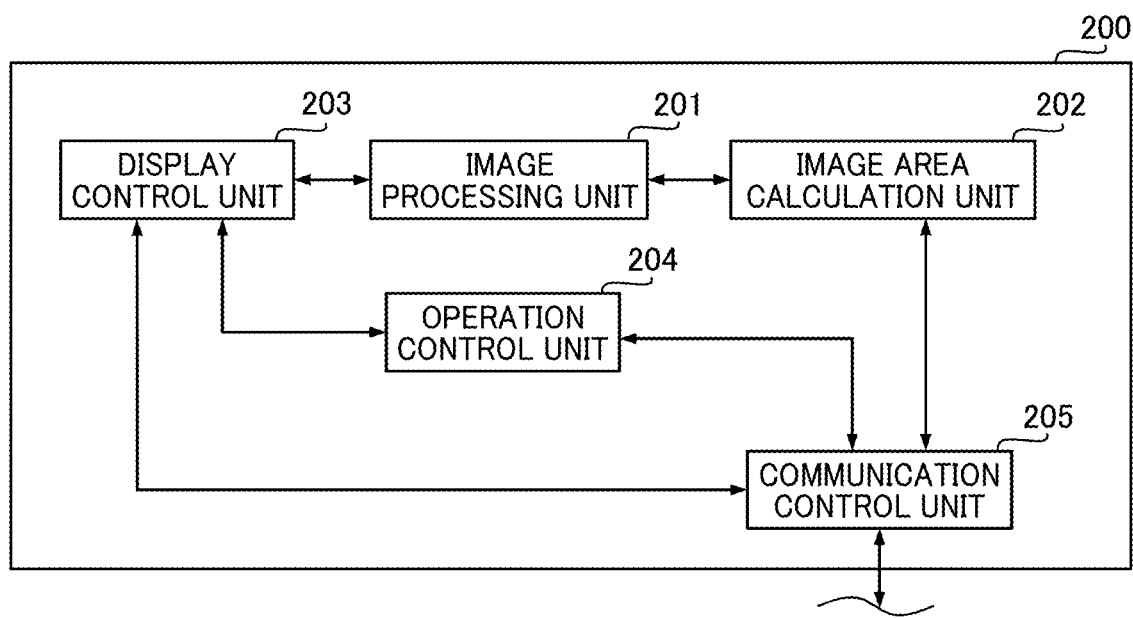
FIG. 7 is a functional block diagram of an internal configuration of a controller of the image data transmitting terminal according to an embodiment of the present disclosure.

In such a hardware configuration, the internal functions of the controller 200 illustrated in FIG. 7 are configured by the CPU 211 performing operations according to programs stored in the ROM 231 or programs read from the storage medium 241 onto the RAM 221. A combination of the internal functions of the controller 200 and the hardware constitutes functional blocks for realizing the functions of the wireless terminal 2a.

Figure 6:
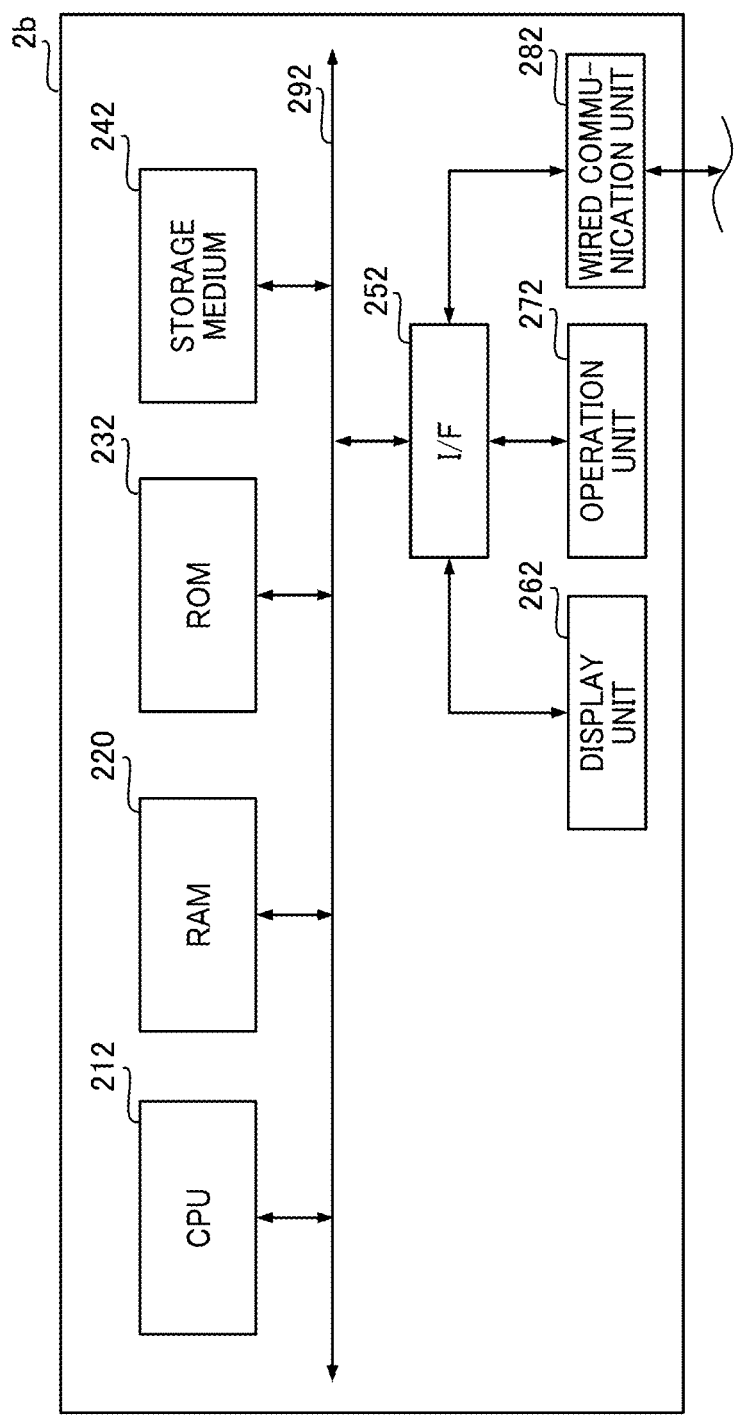
FIG. 6 is a block diagram of a hardware configuration of another image data transmitting terminal according to an embodiment of the present disclosure.

FIG. 6 illustrates a hardware configuration of the wired terminal 2b. The wired terminal 2b according to the present embodiment has a similar configuration to an information processing apparatus such as a general PC. That is, the wired terminal 2b according to the present embodiment is connected to a CPU 212, a RAM 222, a ROM 232, a storage medium 242 such as an HDD, and an I/F 252 via a bus 292. As illustrated in FIG. 6, the difference between the wireless terminal 2a and the wired terminal 2b lies in the wireless communication unit 281 and the wired communication unit 282. That is, the configuration other than the wired communication unit 282 is the same as the configuration of the wireless terminal 2a, and thus detailed descriptions thereof are omitted.

The I/F 252 connects the bus 292 to various hardware, such as the display unit 262 and the operation unit 272, and a network and the like via the wired communication unit 282 to control such various hardware and the network. The wired communication unit 282 includes a configuration for detecting a connection with the wired terminal 2b and a communicable state.

Functional Blocks of Controller 200

Next, the internal functions of the controller 200 of the image data transmission device 2 are described. FIG. 7 is a functional block diagram illustrating a configuration of internal functions of the controller 200 according to the present embodiment. The controller 200 is common to the wireless terminal 2a and the wired terminal 2b.

The controller 200 includes an image processing unit 201, an image area calculation unit 202, a display control unit 203, an operation control unit 204, and a communication control unit 205. The image processing unit 201 performs processing of converting image data selected by the user 4 as an object of image formation output of the handheld printer 1 into a format that can be output by the handheld printer 1.

The image processing unit 201 applies a condition set by the user 4 on the image formation output, for example, a condition such as monochrome or color printing, enlargement or reduction, or the like to perform the processing of converting the image data into the format that can be output by the handheld printer 1.

The image area calculation unit 202 calculates an area in which the image data selected by the user 4 as an object of image formation output of the handheld printer 1 is formed, based on the image data processed by the image processing unit 201, to generate image area information. Note that a configuration may be employed in which the user 4 designates and determines the area in which image data is formed to generate the image area information.

The display control unit 203 controls a screen displayed on the display unit 260. For example, when receiving the out-of-image-area notification information from the handheld printer 1, the display control unit 203 causes the display unit 261 or 262 to display a screen based on the out-of-image-area notification information.

When receiving the offline notification from the handheld printer 1, the display control unit 203 causes the display unit 261 or 262 to display a screen based on the offline notification.

The operation control unit 204 generates control information based on the operation of the operation unit 270 by the user 4 and transmits the control information to each unit of the controller 200. The communication control unit 205 controls communication with the handheld printer 1 and controls transmission and reception of information with the handheld printer 1.

With the above-described configuration, the image forming system 1000 according to the present embodiment executes the image formation output on the recording medium 3 using the handheld printer 1 based on the image data received from the image data transmission device 2.

When an image formation output is performed using the handheld printer 1, the user 4 scans the recording medium 3 while holding the handheld printer 1. Accordingly, if the handheld printer 1 scans the inside of a virtually set image area on the recording medium 3, the image formation output is performed.

Note that, since a marker or the like indicating the image area 300 is not indicated on the recording medium 3, it is difficult for the user 4 to recognize that the position corresponds to the inside of the image area 300 while scanning the handheld printer 1. Therefore, the user 4 scans all over the recording medium 3 in order to print all the image as an object of image formation output.

The handheld printer 1 according to the present embodiment notifies the user 4 of the positional relationship with a current position of the handheld printer 1 and an image area 300, which is an area in which image data is formed on the recording medium 3, so that the user 4 can efficiently perform scanning in the image formation output. Such notification can reduce unnecessary scanning of the handheld printer 1 by the user 4 on the recording medium 3 can be reduced, thus allowing image formation output to be efficiently performed.

The positional relationship between the current position of the handheld printer 1 and the area in which the image data is formed on the recording medium 3 is mainly classified into three examples. The first example is a case where the handheld printer 1 is going to move away from the inside of the image area 300 to the outside of the image area 300. The second example is a case where the handheld printer 1 outside the image area 300 is going to move away from the image area 300 by scanning. The third example is a case where the handheld printer 1 outside the image area 300 is scanned in a direction approaching the image area 300 and is going to enter the image area 300.

Embodiment of Image Forming Output Operation

Figure 8:
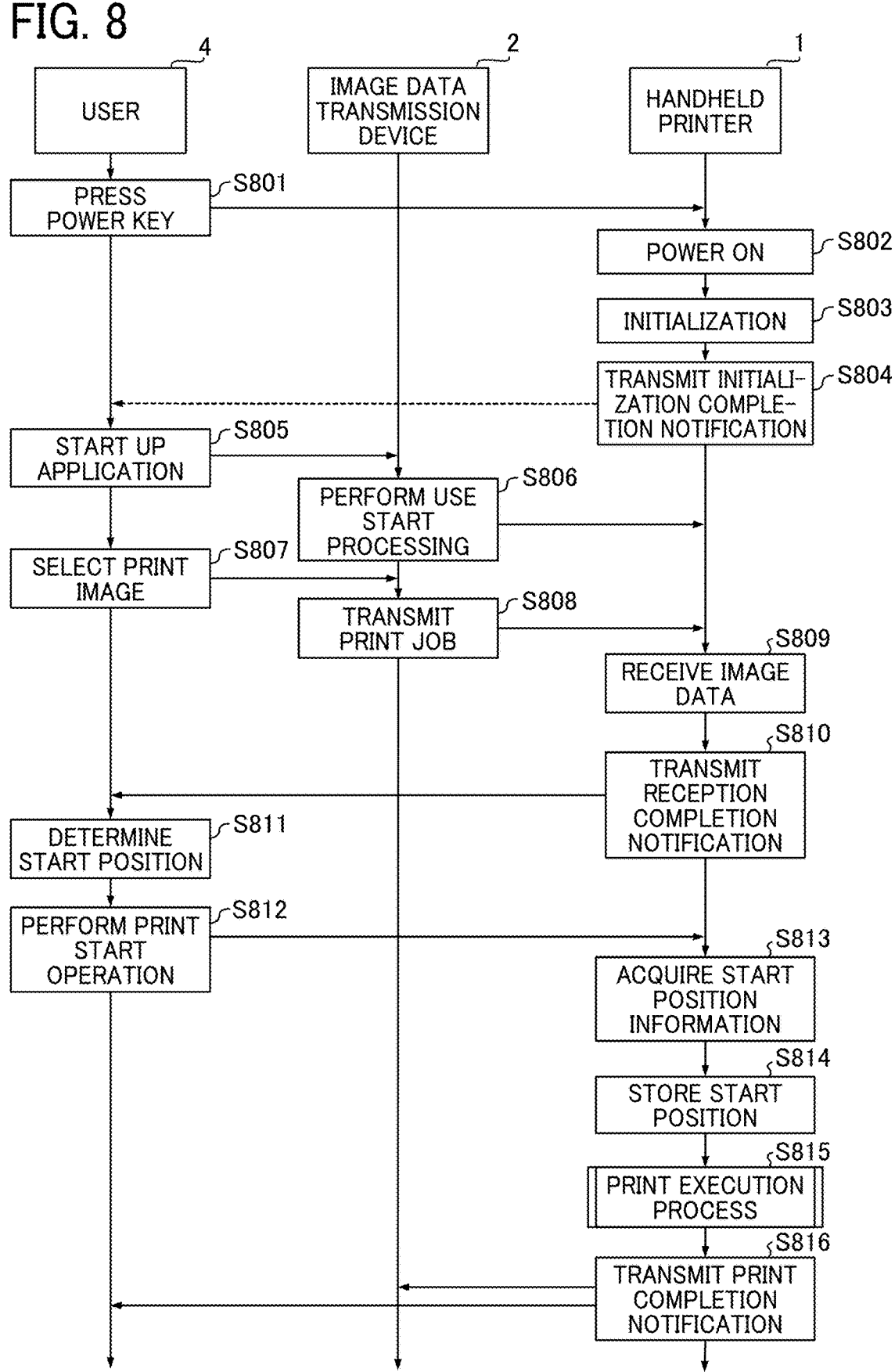
FIG. 8 is a sequence diagram of an operation procedure from start-up of the handheld printer to completion of image formation according to an embodiment of the present disclosure.

Next, a flow of an image forming output operation using the handheld printer 1 according to the present embodiment is described. FIG. 8 is a sequence diagram of an operation procedure from start-up to completion of image formation of the handheld printer 1 according to the present embodiment.

In the process of FIG. 8, the processing for which the CPU 111 is described as an execution subject is processing realized by functions that becomes available by the CPU 111 executing firmware or the like.

When the user 4 presses the power switch of the handheld printer 1 (S801), the handheld printer 1 starts power supply from the power supply 141 (S802). When the power supply is started, the CPU 111 executes an initialization process for setting each electronic device constituting the handheld printer 1, for example, each component such as the ASIC/FPGA 120 to an initial state (S803).

When the initialization of each component of the handheld printer 1 is completed, for example, the CPU 111 turns on an LED mounted as a backlight of a power switch to execute an initialization completion notification for notifying the user 4 that the handheld printer 1 is available (S804). When a sound generation mechanism is implemented as the OPU 104, the initialization completion notification for the user 4 may be performed by voice.

After recognizing that the handheld printer 1 is available, the user 4 starts up an application for using the handheld printer 1 in the image data transmission device 2 (S805). The application started in the image data transmission device 2 (hereinafter, may be abbreviated as "app") executes the use start processing of the image data transmission device 2 (S806).

The use start processing (S806) is processing of establishing a communication state between the image data transmission device 2 and the handheld printer 1 so that a communication process with the handheld printer 1 can be performed. The use start processing (S806) includes processing of receiving information indicating the state of the handheld printer 1.

Figure 18:
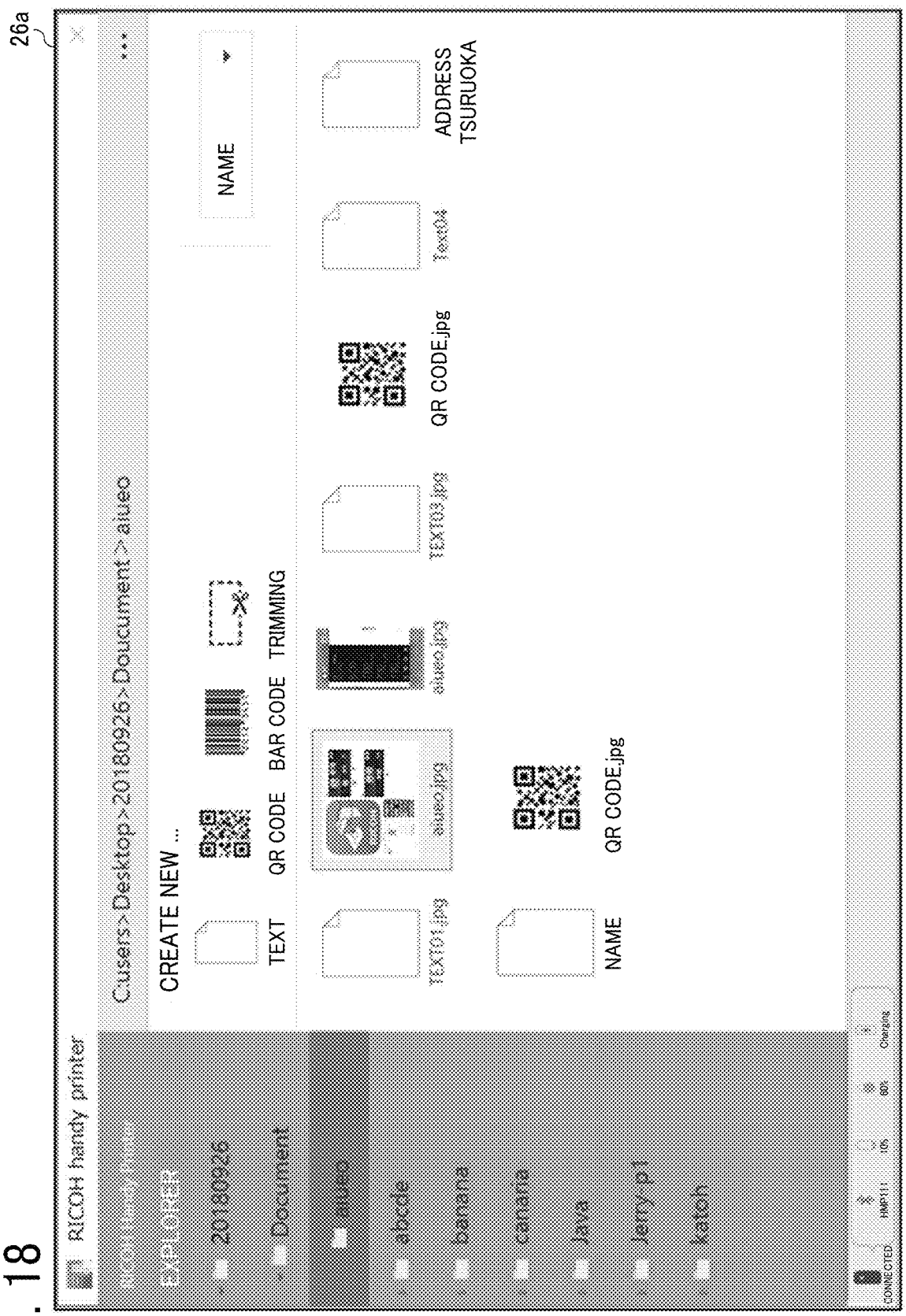
FIG. 18 is a diagram illustrating another example of the screen display of the terminal connected to the handheld printer.

After the use start processing of the handheld printer 1 is completed, the user 4 selects an image to be printed (an image to be formed and output) using the handheld printer 1 by, for example, displaying the image on the image data transmission device 2 (S807). FIG. 18 is a display example displayed on the display units (261, 262) of the image data transmission device 2 in S807. As illustrated in a display 26a illustrated in FIG. 18, the image data transmission device 2 displays, on the screen of the application, selection of the data to be subjected to image formation output and the status of the connected handheld printer 1 (remaining battery level, remaining ink level, etc.).

Referring back to FIG. 8, a description is further given. When the user 4 performs an operation of printing the image selected in S807 in the image data transmission device 2, the image data transmission device 2 generates and transmits the print job and the image area information to the handheld printer 1 (S808).

Note that, when the user 4 performs the operation of printing the image selected in S807, the application installed in the image data transmission device 2 calls a printer driver, describes printing conditions and the image data in a predetermined format, and sends the printing conditions and the image data to the handheld printer 1. Note that image data in a format of TIFF, JPEG, or the like may be transmitted to the handheld printer 1 without changing the format using a printer driver.

The image area calculation unit 202 generates image area information using the upper left end of the image data selected as an image to be formed by the user 4 as an origin. The image area calculation unit 202 may also generate the image area information with a margin around the area in which the image is actually formed, in consideration of the width of the body of the handheld printer 1 and the like.

When the transmission of the image data to the handheld printer 1 is started (S808), the CPU 111 notifies the user 4 that the image data is being received, for example, by blinking the LED switch (S809).

When the reception of the image data is completed, the CPU 111 notifies the user 4 of the completion of the reception of the image data by, for example, changing the blinking of the LED switch to the lighting (S810). The CPU 111 transfers the received image data to the DMAC 122.

When the OPU 104 has a sound generation mechanism, the image data reception notification in S807 and the image data reception completion notification in S808 may be performed by voice.

When recognizing that the reception of the image data in the handheld printer 1 is completed, the user 4 determines the initial position of the handheld printer 1 on the recording medium 3, that is, the start position of the image formation (S811).

The user 4 determines the initial position by, for example, an operation of placing the handheld printer 1 at an arbitrary position on the recording medium 3. After determining the initial position, the user 4 places the handheld printer 1 at an arbitrary position on the recording medium 3 as an expected start position of image formation output, and performs a print start operation of pressing the LED switch (S812).

The CPU 111 accepts a key interrupt by the LED switch and causes the navigation sensor 105 to detect the position of the handheld printer 1 via the navigation sensor I/F 125 (S813). The initial position of the handheld printer 1 on the recording medium 3 detected by the navigation sensor 105 in the processing of S813 is the position of the handheld printer 1 at the start of image formation, that is, the start position of image formation by the handheld printer 1.

Information on the start position detected by the navigation sensor 105 is stored in a storage medium such as the DRAM 102 as start position information of the handheld printer 1 (S814).

As described above, the distance from the navigation sensor 105 to the end of the IJ recording head 108, the distance from a nozzle at the position closest to the end of the IJ recording head 108 and the end of the IJ recording head 108, and the distance between the nozzles arranged in the IJ recording head 108 are stored in advance in a storage medium such as the ROM 103.

Therefore, the position calculation unit 112 can calculate the positions of the IJ recording head 108 and the nozzles arranged in the IJ recording head 108 based on the position information of the handheld printer 1.

Based on the detection result of the navigation sensor 105 acquired in S813, the position calculation unit 112 may calculate the positions of the IJ recording head 108 and the nozzles arranged in the IJ recording head 108.

Further, the result calculated by the position calculation unit 112 may be stored in a storage medium such as the DRAM 102 as start position information on the positions of the IJ recording head 108 and the nozzles arranged in the IJ recording head 108 at the start of image formation output.

The start position of the handheld printer 1 detected by the navigation sensor 105 may be stored as, for example, the coordinates (0, 0) in the DRAM 102 or the like. After storing the start position, the CPU 111 starts a print execution process (S815). Details of the print execution process are described later.

When determining that the processing of S815 is completed, the CPU 111 transmits a print completion notification to the image data transmission device 2. The CPU 111 notifies the user 4 that the printing of the image data has been completed, for example, by turning off the LED switch (S816).

Note that, for the handheld printer 1 according to the present embodiment, the user 4 cannot recognize whether the handheld printer 1 is scanning an image area in which image data is formed on the recording medium 3 during execution of image formation output on the recording medium 3. Here, the handheld printer 1 also has a function of notifying the user 4 of the state of the positional relationship between the current position and the image area.

Detailed Flow of Print Execution Process (S815)

Figure 9:
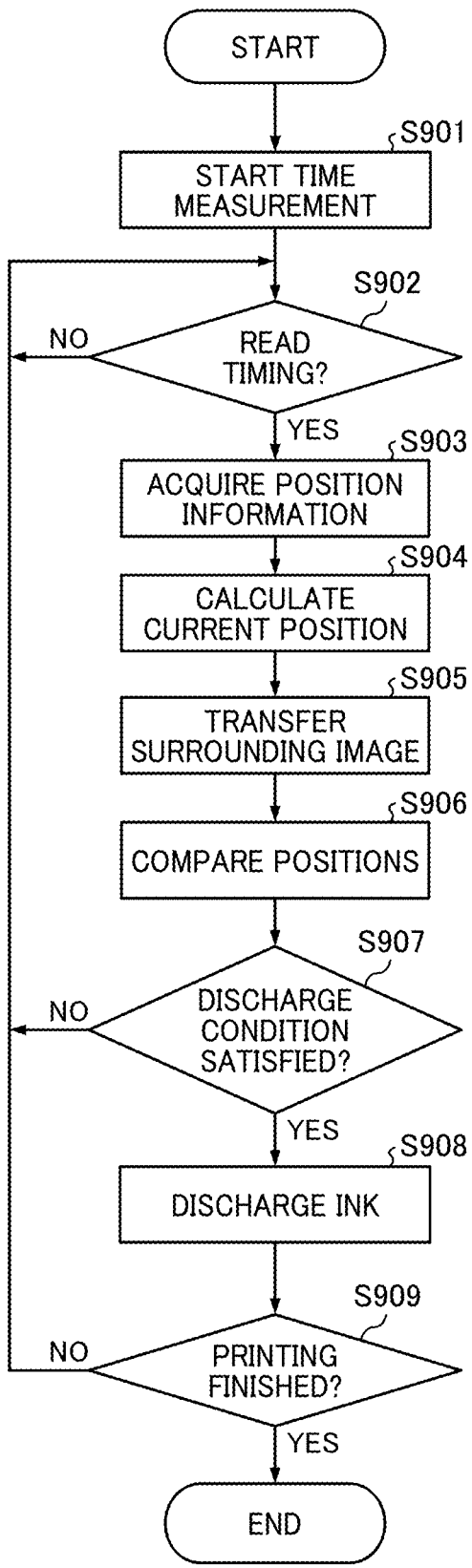
FIG. 9 is a flowchart illustrating a flow of a print execution process of the handheld printer according to an embodiment of the present disclosure.

Details of the print execution process of S815 are described with reference to the flowchart of FIG. 9. When the start position information of the handheld printer 1 is stored in the storage medium by the processing of S814, the CPU 111 causes the printing-and-sensor timing generation unit 126 to start time measurement (S901). In S901, the position of the IJ recording head 108 and the positions of the nozzles arranged in the IJ recording head 108 may be stored as the start position information of the handheld printer 1.

When a preset read timing of the navigation sensor 105 comes (YES in S902), the navigation sensor I/F 125 causes the navigation sensor 105 to detect the moving amount of the handheld printer 1 and the like (S903).

The CPU 111 acquires the detection result of the navigation sensor 105 from the ASIC/FPGA 120 and causes the position calculation unit 112 to calculate the current position P1 of the handheld printer 1 (S904). In the processing of S904, the position calculation unit 112 calculates the current position P1 (X1, Y1) of the handheld printer 1 based on the position P (X, Y) of the handheld printer 1 calculated last time and the moving amount $\Delta P$ ($\Delta X$, $\Delta Y$) of the handheld printer 1 acquired this time and stores the current position P1 in the DRAM 102.

Subsequently, the CPU 111 transfers the information on the calculated current position P1 (X1, Y1) of the handheld printer 1 to the ASIC/FPGA 120. Note that, based on the position information of the handheld printer 1, the position calculation unit 112 calculates the positions of the IJ recording head 108 and the nozzles arranged in the IJ recording head 108, and the CPU 111 may transfer the calculation result to the ASIC/FPGA 120 as the current position P1 of the IJ recording head 108 and each of the nozzles arranged in the IJ recording head 108.

The DMAC 122 acquires image data around the nozzles arranged in the IJ recording head 108 from the DRAM 102 based on the position information of the current position P1 (X1, Y1) of the handheld printer 1 and temporarily stores the image data in the image RAM 121.

The rotation processing unit 123 acquires image data around the nozzles from the image RAM 121 based on the current position P1 (X1, Y1) of the handheld printer 1 and performs rotation processing on the acquired image data around the nozzles. (S905).

The DMAC 122 deletes, from the DRAM 102, the image data around the nozzles acquired from the DRAM 102. The IJ-recording-head control unit 127 compares the coordinates of the rotated image data with the coordinates of the nozzle position determined based on the current position P1 (X1, Y1) of the handheld printer 1 (S906).

When it is determined that the preset ink discharge condition is satisfied, that is, the nozzle position has reached the target discharge position that is determined as a position on which ink is to be discharged based on the image data, or the deviation between the nozzle position and the target discharge position is within an allowable error (S907/YES), the IJ-recording-head control unit 127 inputs the rotated image data around the nozzles of the IJ recording head 108 to the IJ-recording-head drive circuit 107 in the processing of S905.

The IJ-recording-head drive circuit 107 causes the IJ recording head 108 to discharge ink to the recording medium 3 based on the input image data (S908). Until all image data as the object of image formation output stored in the DRAM 102 is transferred to the DMAC 122 or until a signal for ending the image formation output is received by, e.g., operation of the user 4 on the LED switch (NO in S909), the processing steps from S902 to S908 are repeatedly executed to form an image on the recording medium 3.

In S908, ink is discharged, and all the image data as the object of image formation output stored in the DRAM 102 has been transferred to the DMAC 122 or the signal for ending the image formation output has been received by, e.g., the operation of the user 4 on the LED, the CPU 111 determines that the image formation output has ended (YES in S909).

Priority Communication Control Flow in Handheld Printer 1

Next, details of a communication process in the handheld printer 1 are described with reference to a sequence diagram of FIG. 10. As described above, the handheld printer 1 has a communication connection function for performing data communication with the wireless terminal 2a and the wired terminal 2b. In general, when the power of the wireless terminal 2a is turned on, the wireless terminal 2a is automatically connected to the handheld printer 1 if the wireless connection with the handheld printer 1 is set in advance and the wireless terminal 2a is within a radio wave reachable range. On the other hand, the connection between the wired terminal 2b and the handheld printer 1 needs to be physically made by the user 4 using a communication cable.

Figure 10:
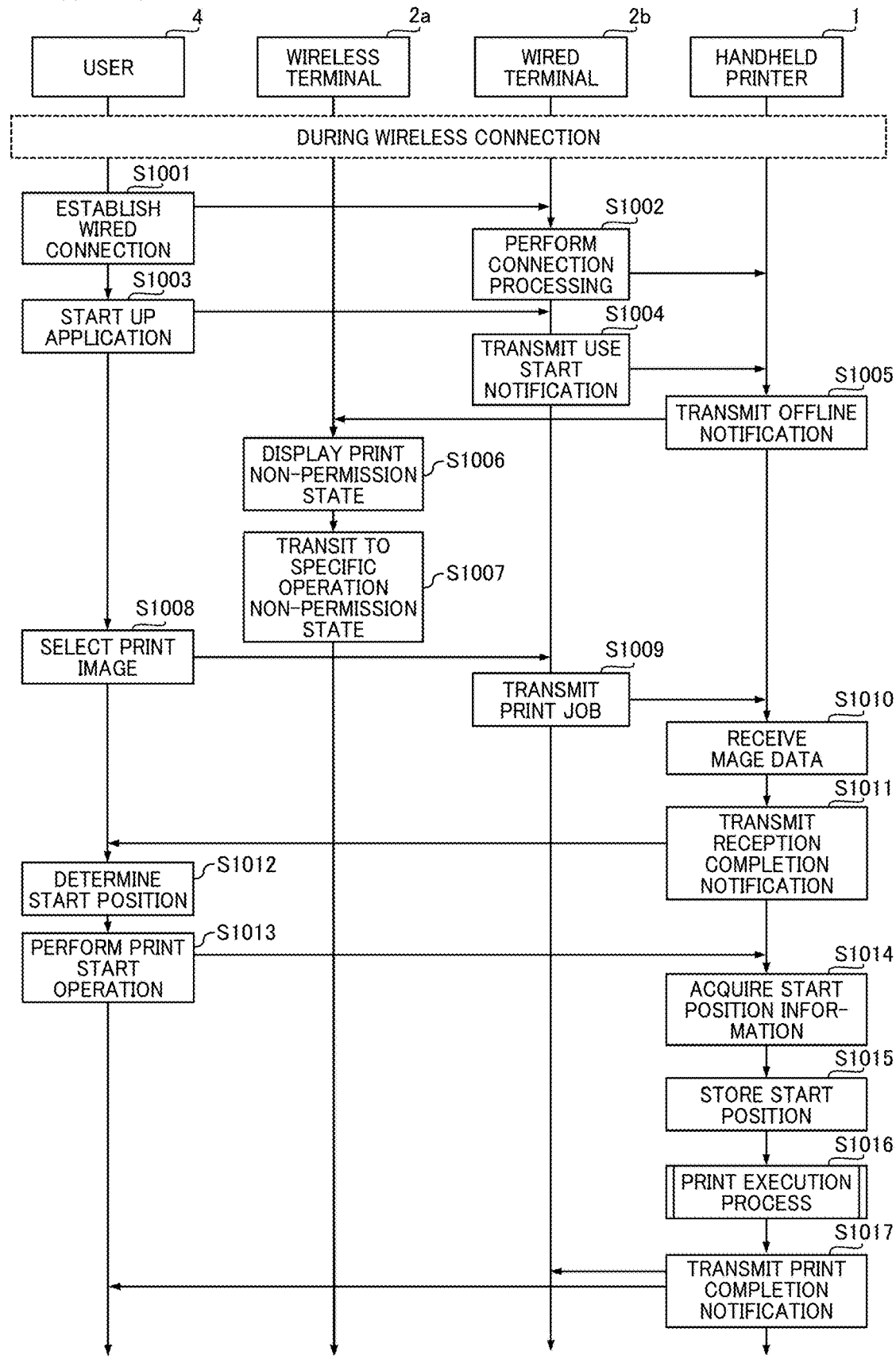
FIG. 10 is a flowchart illustrating a flow of a communication process of the handheld printer according to an embodiment of the present disclosure.

The sequence illustrated in FIG. 10 is a flow of a communication control process performed when the user 4 connects the handheld printer 1 to the wired terminal 2b by wire while the handheld printer 1 is being wirelessly connected to the wireless terminal 2a. When the user 4 connects the wired terminal 2b to the handheld printer 1 during wireless connection (S1001), the wired terminal 2b performs connection processing for the handheld printer 1 (S1002). At this time, the connection processing with the wired terminal 2b is also performed in the handheld printer 1. As a result, the handheld printer 1 and the wired terminal 2b are physically connected to each other and are in a state in which mutual data communication is possible.

The user 4 starts an application installed in the wired terminal 2b (S1003). When the application is activated, the display 26a illustrated in FIG. 18 is displayed on the display unit 262 of the wired terminal 2b. The wired terminal 2b transmits a "use start notification" to the handheld printer 1 by the activated application. The handheld printer 1 that has received the "use start notification" transitions to a state where data communication with the wired terminal 2b connected later is possible. Based on the transition, the handheld printer 1 transmits an "offline notification" to the wireless terminal 2a connected earlier (S1005). The offline notification is control information for the handheld printer 1 to give priority to the connection with the wired terminal 2b and to stop transmitting data for image formation to the wireless terminal 2a connected at the same time. The handheld printer 1 that has transmitted the offline notification then stops receiving data from the wireless terminal 2a.

When the handheld printer 1 is connected to the wired terminal 2b for charging a battery, the application need not be started. In such a case, since the "use start notification" is not transmitted, the wireless terminal 2a can continue to use the handheld printer 1.

Figure 12:
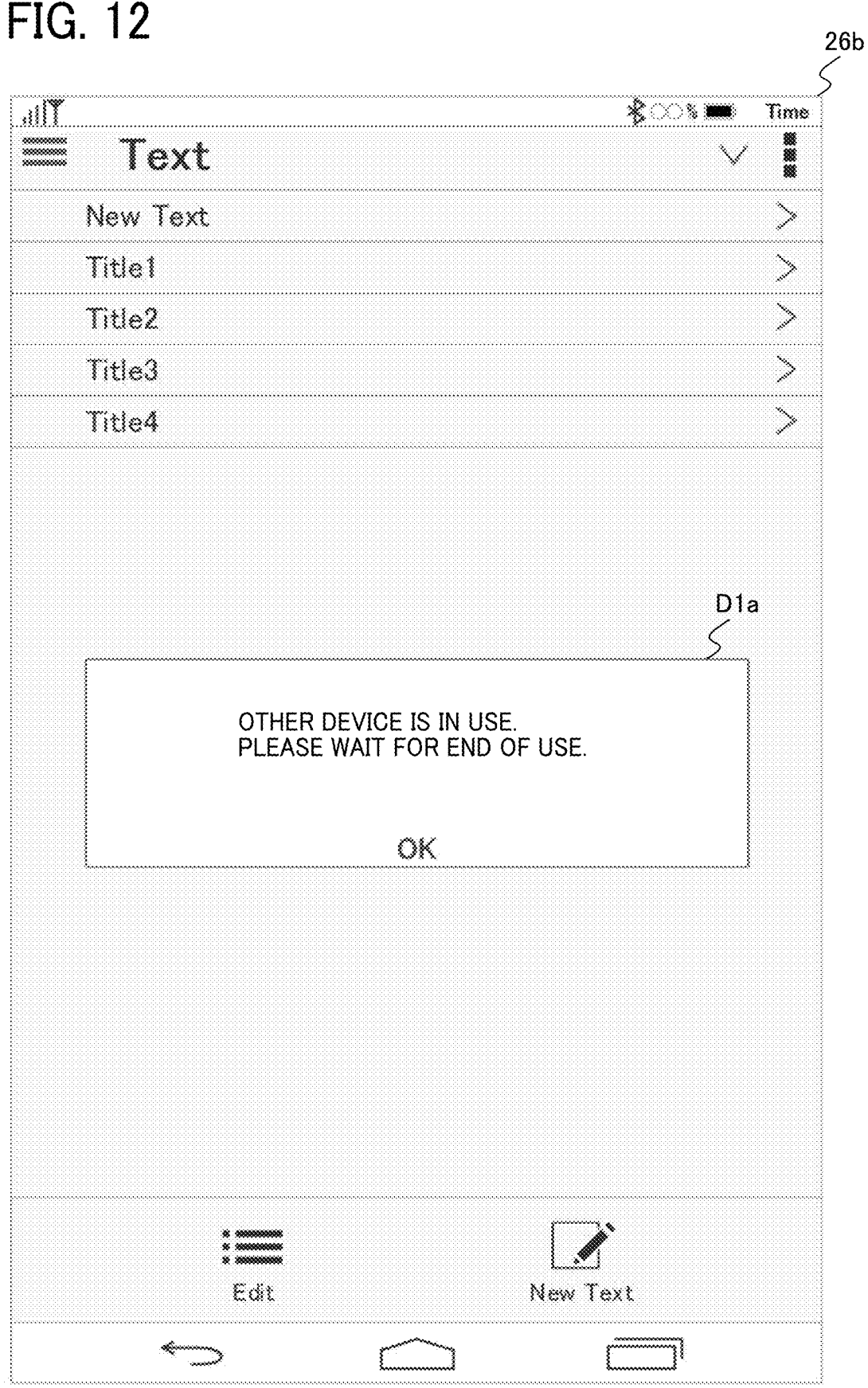
FIG. 12 is a diagram illustrating an example of a screen display of a terminal connected to the handheld printer.
Figure 13:
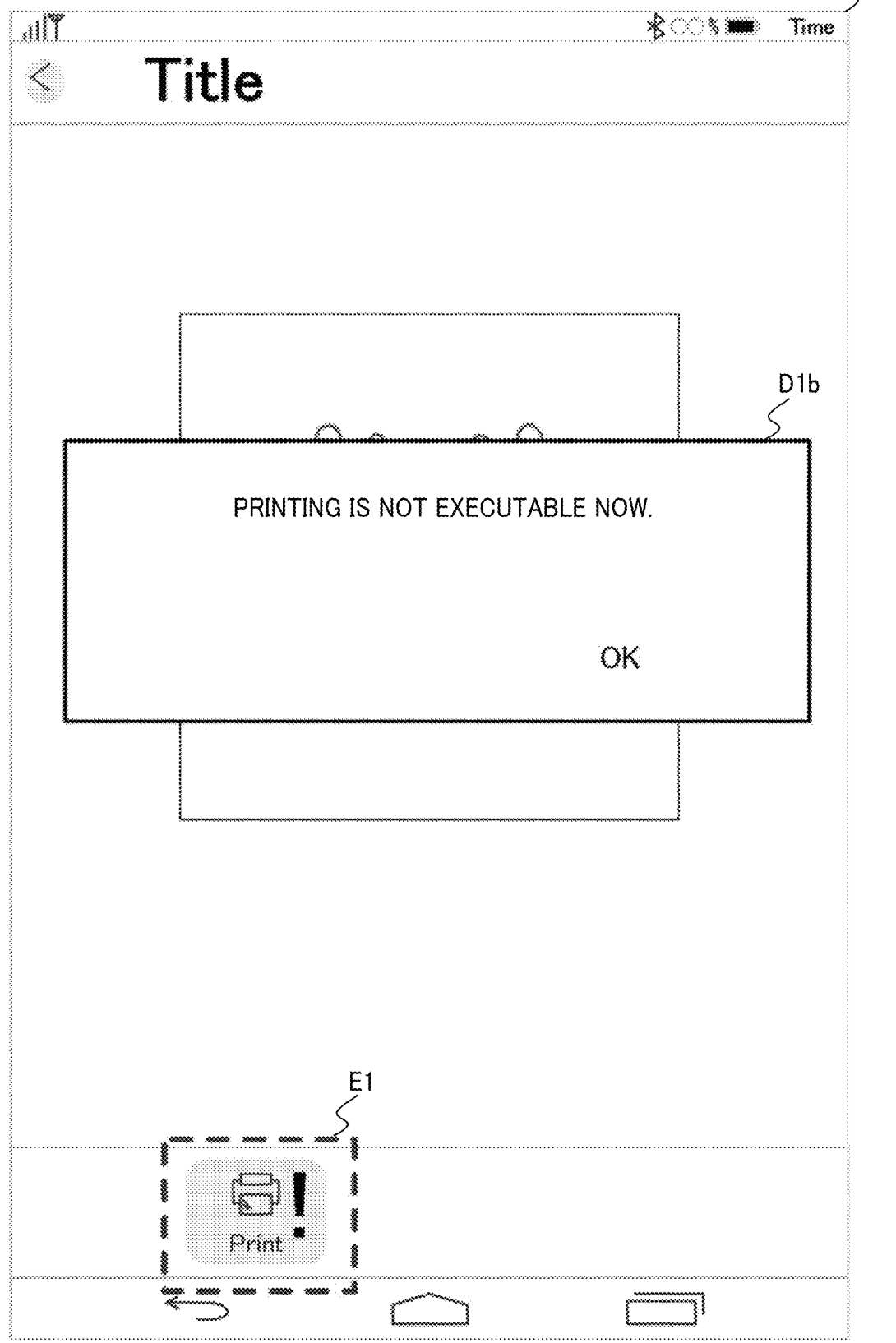
FIG. 13 is a diagram illustrating another example of the screen display of the terminal connected to the handheld printer.

The wireless terminal 2a that has received the "offline notification" displays a print non-permission display on the display unit 261 (S1006). FIGS. 12 and 13 illustrate examples of the display displayed in S1006. In S1006, as in a display 26b illustrated in FIG. 12, a non-permission dialog D1a indicating that the handheld printer 1 is not available is displayed on a screen for selecting target data for image formation output in the application of the wireless terminal 2a. In S1006, as in a display 26c illustrated in FIG. 13, a non-permission dialog D1b is displayed indicating that the printing using the handheld printer 1 cannot be executed. Further, as in the display 26c, the display of an icon E1 operated by the user 4 for executing printing is devised so that the user 4 can visually recognize "a state in which printing is not permitted".

The wireless terminal 2a that has received the "offline notification" executes the display process in S1006 and the process of transiting to the "specific operation non-permission" state in which the printing (image formation output) operation from the user 4 is not accepted (S1007). By S1007, the transmission process of the image data from the wireless terminal 2a to the handheld printer 1 is disabled. Such a process can prevent image data from being transmitted from the wireless terminal 2a when the handheld printer 1 is executing the processing related to the image data in connection with the wired terminal 2b, thus preventing the image data from the wireless terminal 2a from being mixed with the image data from the wired terminal 2b.

Then, the user 4 executes a printing process using the wired terminal 2b (S1008 to S1017). The processing executed here is the same as the processing in steps S807 to S816 described above, and a detailed description thereof is omitted.

When both wireless and wired communication interfaces are provided as in a handheld mobile printer, user convenience may be enhanced by giving priority to wired communication over wireless communication. In other words, if the wired communication is possible, for example, the user can transfer data more reliably than the wireless communication and the wired communication has a higher data transfer speed than the wireless communication. Accordingly, the image forming process can be executed reliably and at high speed. Therefore, in the case where a communication apparatus capable of supporting both wireless communication and wired communication is provided, the convenience for the user can be enhanced by automatically giving priority to using wired communication instead of wireless communication.

As described above, when both the wireless communication and the wired communication are connected, the handheld printer 1 according to the present embodiment controls the communication so that the wired communication is prioritized. As a result, even when the user 4 makes a wired connection while the handheld printer 1 is automatically being connected by wireless communication, it is possible to prevent simultaneous reception and interference of data from both communication systems, thus enhancing the convenience of the user 4.

Figure 11:
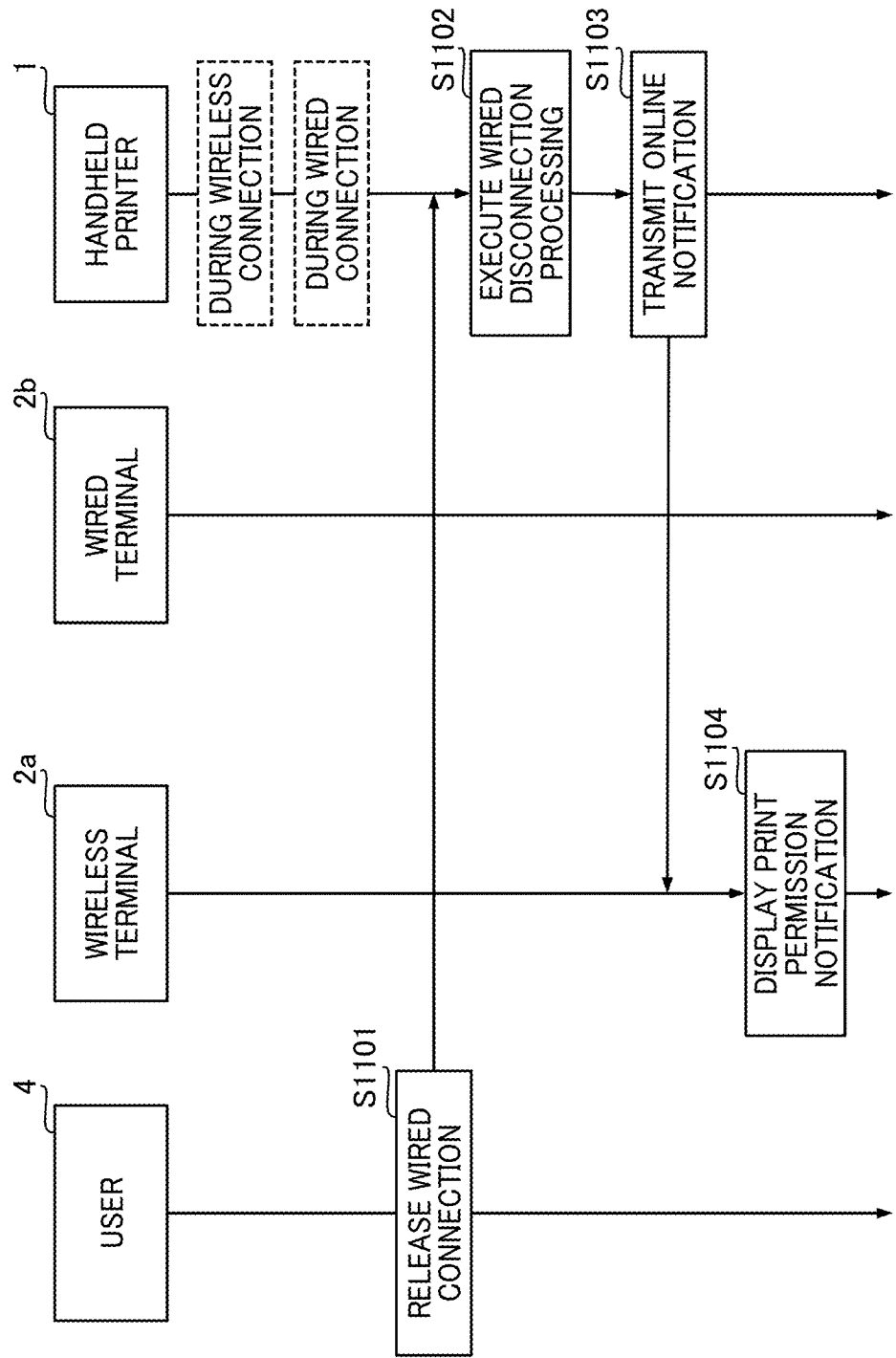
FIG. 11 is a flowchart illustrating a flow of a communication control process of the handheld printer according to an embodiment of the present disclosure.

Further, with reference to a sequence diagram of FIG. 11, a description is given of the communication control after the print completion notification is transmitted in S1017, that is, in the case where the data communication of only the wired connection is permitted while the wireless communication is being performed but the data communication by the wireless communication is stopped. As illustrated in FIG. 11, after receiving the print completion notification, the user 4 releases the wired connection of the handheld printer 1 (S1101).

The release of the wired connection (1101) means, for example, that the user 4 disconnects the connection cable from the handheld printer 1 to the wired terminal 2*b*. In addition, for example, when there is no operation from the user 4 to the application running on the wired terminal 2*b* for a certain period of time, when the termination of the application is selected, and when the power of the wired terminal 2*b* is turned off, the release of the wired connection is performed (S1101). When no application operation is performed on the wired terminal 2*b* for a certain period of time, data communication from the wired terminal 2*b* to the handheld printer 1 is not performed for a certain period of time. Therefore, in such a state, even if data communication from the wireless terminal 2*a* is received, data from the wireless terminal 2*a* does not mix with data from the wired terminal 2*b* in the handheld printer 1. Therefore, when the state in which data communication from the wired terminal 2*b* is not performed can be determined to continue, data communication with the wireless terminal 2*a* may be restarted.

Therefore, when the wired connection is released, the handheld printer 1 executes wired disconnection processing (S1102) and transmits an "online notification" to the wireless terminal 2*a* (S1103).

Figure 14:
FIG. 14 is a diagram illustrating another example of the screen display of the terminal connected to the handheld printer.
Figure 15:
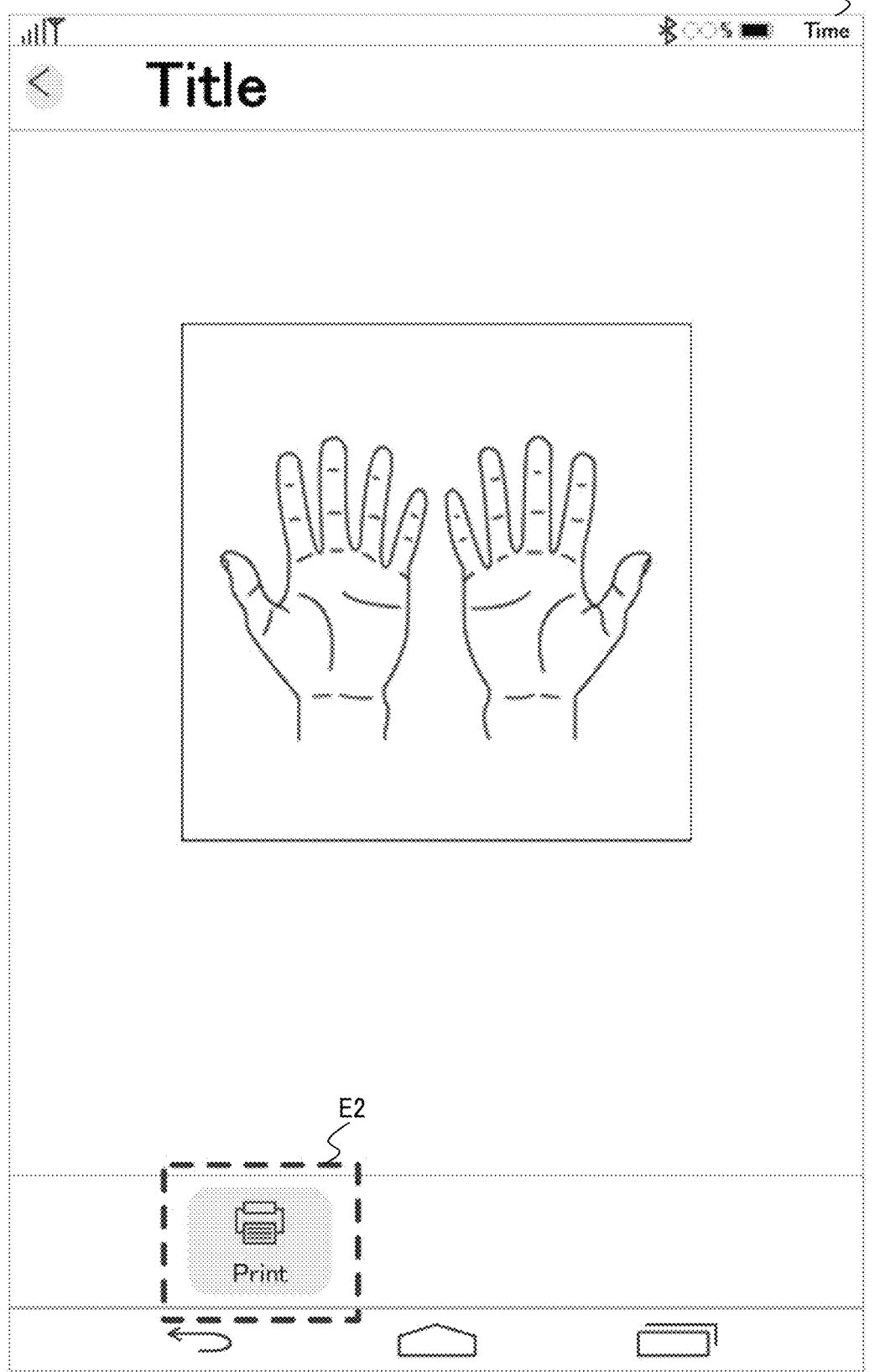
FIG. 15 is a diagram illustrating another example of the screen display of the terminal connected to the handheld printer.

The wireless terminal 2*a* that has received the "online notification" displays a print non-permission display on the display unit 261 (S1104). FIGS. 14 and 15 illustrate examples of the display displayed in S1104. In S1104, as in a display 26*d* illustrated in FIG. 14, a permission dialog D2*a* indicating that the handheld printer 1 is available is displayed on the screen for selecting target data of the image formation output in the application of the wireless terminal 2*a*. In S1104, as illustrated in a display 26*e* in FIG. 15, the display of an icon E2 operated by the user 4 for executing printing is devised so that the user 4 can visually recognize "a state in which printing is permitted".

In addition, the wireless terminal 2*a* that has received the "online notification" executes the display processing in S1006 and the process of transiting to the "specific operation permission" state in which the printing (image formation output) operation from the user 4 is accepted (S1105). By S1105, the transmission process of image data from the wireless terminal 2*a* to the handheld printer 1 is in an execution state. Thus, when the handheld printer 1 is connected to the wired terminal 2*b* and is executing the processing on image data, the state in which image data cannot be transmitted from the wireless terminal 2*a* is transited to a state in which data communication by the wireless connection is automatically available. That is, data communication can be automatically restarted.

Flow of Communication Control Process in Handheld Printer 1

Figure 16:
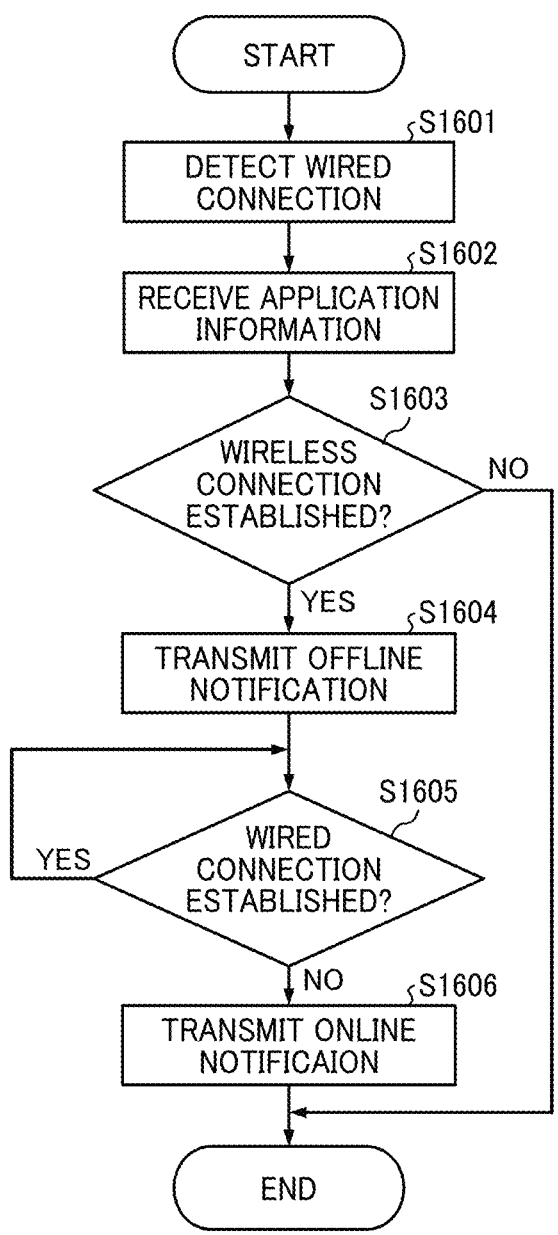
FIG. 16 is a flowchart illustrating a flow of a communication control process of the handheld printer according to an embodiment of the present disclosure.

Next, the flow of a communication control process in the handheld printer 1 according to the present embodiment is described with reference to a flowchart of FIG. 16. In the handheld printer 1, when the communication control unit 129 detects the connection with the wired terminal 2*b* via the communication I/F 109, the communication control unit 129 notifies the CPU 111 of the connection (S1601). Thus, a wired connection is established. Then, the handheld printer 1 receives the application information sent from the wired terminal 2*b* and detects that the application has been started up and accessed in the wired terminal 2*b* (S1602).

Subsequently, the communication control unit 129 determines whether there is a connection with the wireless terminal 2*a* (S1603). Here, if there is no connection with the wireless terminal 2*a* (NO in S1603), the communication control unit 129 terminates the communication control process without performing any specific process.

If there is a connection with the wireless terminal 2*a* (YES in S1603), the handheld printer 1 transmits the "offline notification" to the connected wireless terminal 2*a* (S1604).

Then, the handheld printer 1 constantly monitors whether the wired connection is established (S1605). When determining that the wired connection is not established (NO in S1606), the handheld printer 1 transmits the "online notification" to the wireless terminal 2*a*. (S1606). Note that the monitoring target in S1606 is not limited to the presence or absence of a physical connection with the wired terminal 2*b*, and the disconnection may be determined based on a connection release notification from the wired terminal 2*b* or a condition such as timeout.

Process Control Process Flow in Wireless Terminal 2*a*

Figure 17:
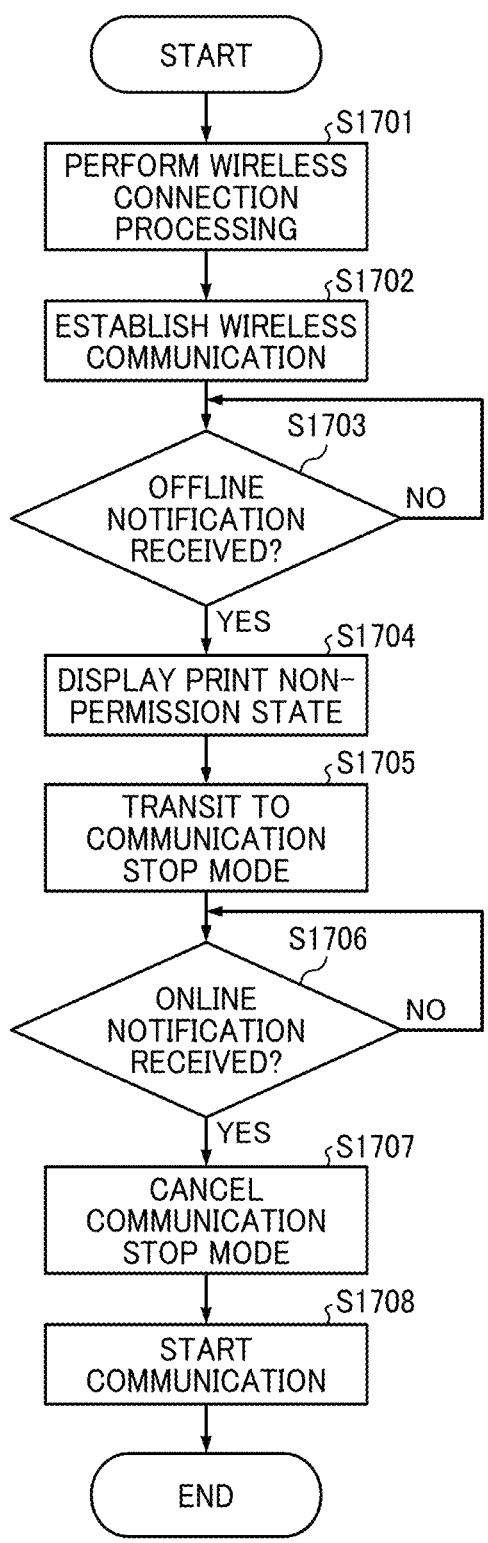
FIG. 17 is a flowchart illustrating a flow of a communication control process in a terminal connected to the handheld printer.

Next, a flow of a communication control process in the wireless terminal 2*a* according to the present embodiment is described with reference to the flowchart in FIG. 17. When the power of the wireless terminal 2*a* is turned on, the communication control unit 205 executes wireless connection processing with the handheld printer 1 (S1701). Thus, a wireless connection is established (S1702).

Then, the wireless terminal 2*a* constantly monitors whether an "offline notification" is received from the handheld printer 1 (S1702). When the "offline notification" is received (YES in S1702), the display control unit 203 displays, for example, the display 26*b* illustrated in FIG. 12 or the display 26*c* illustrated in FIG. 13 on the display unit 261 (S1704). The communication control unit 205 transits to a "communication stop mode" in which image data and the like are not transmitted to the handheld printer 1 (S1705).

Then, the wireless terminal 2*a* constantly monitors the "online notification" from the handheld printer 1 (S1706). Then, when receiving the online notification (YES in S1706), the communication control unit 205 releases the "communication stop mode" (S1707). Thus, the wireless terminal 2*a* automatically restarts the data communication with the handheld printer 1 (S1708).

The present disclosure is not limited to the above-described embodiments, and can be modified in other embodiments, additions, modifications, deletions, and the like within a range that can be conceived by those skilled in the art. As long as the functions and effects of the present invention are exhibited, they are included in the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication apparatus for data communication with a plurality of external devices, the communication apparatus comprising:
 a communication interface configured to perform wired communication and wireless communication with the plurality of external devices; and
 processing circuitry configured to:
  determine whether the plurality of external devices is connected via the wired communication or the wireless communication; and
  switch a connection destination from one external device to another external device of the plurality of external devices when the one external device is connected via one of the wired communication and the wireless communication and the processing circuitry receives a connection request from the another external device via the other of the wired communication and the wireless communication, wherein
 the communication interface is further configured to
  transmit a connection state change notification, which includes a connection stop notification, to the one external device when the connection destination is switched to the another external device, and
  transmit, after the connection destination is switched to the another external device and the one external device receives the connection stop notification, a connection restart notification to the one external device.

2. The communication apparatus according to claim 1, wherein the processing circuitry switches the connection destination from the one external device to the another external device when the one external device is connected via the wireless communication and the processing circuitry receives the connection request from the another external device via the wired communication.

3. The communication apparatus according to claim 1, wherein the connection stop notification instructs the one external device to stop communication via the one of the wire communication and the wireless communication.

4. The communication apparatus according to claim 3, wherein the processing circuitry is further configured to receive image data, from the another external device via the other of the wired communication and the wireless communication, after transmitting the connection stop notification to the one external device.

5. The communication apparatus according to claim 4, wherein the processing circuitry is further configured to transmit a reception completion notification to the another external device after receiving the image data.

6. The communication apparatus according to claim 1, wherein the connection restart notification instructs the one external device to restart communication via the one of the wire communication and the wireless communication.

7. A communication method for performing data communication with a plurality of external devices via wired communication or wireless communication, the method comprising:
 determining whether the plurality of external devices is connected via the wired communication or the wireless communication;
 switching a connection destination from one external device to another external device of the plurality of external devices when the one external device is connected via one of the wired communication and the wireless communication and a connection request from the another external device is received via the other of the wired communication and the wireless communication;
 transmitting a connection change state notification to the one external device when the connection destination is switched to the another external device by the switching, the connection state change notification including a connection stop notification; and
 transmitting, after the connection destination is switched to the another external device by the switching and the one external device receives the connection stop notification, a connection restart notification to the one external device.

8. The communication method according to claim 7, wherein the switching switches the connection destination from the one external device to the another external device when the one external device is connected via the wireless communication and the connection request from the another external device is received via the wired communication.

9. The communication method according to claim 7, wherein the connection stop notification instructs the one external device to stop communication via the one of the wire communication and the wireless communication.

10. The communication method according to claim 9, further comprising:
 receiving image data, from the another external device via the other of the wired communication and the wireless communication, after transmitting the connection stop notification to the one external device.

11. The communication method according to claim 10, further comprising:
 transmitting a reception completion notification to the another external device after receiving the image data.

12. The communication method according to claim 7, wherein the connection restart notification instructs the one external device to restart communication via the one of the wire communication and the wireless communicate on.

13. A non-transitory storage medium storing a plurality of instructions which, when executed by one or more processors, cause the processors to perform a communication method for performing data communication in connection with a plurality of external devices, the method comprising:
 performing wired communication with the plurality of external devices;
 performing wireless communication with the plurality of external devices;
 determining whether the plurality of external devices is connected via the wired communication or the wireless communication;
 switching a connection destination from one external device to another external device of the plurality of external devices when the one external device is connected via one of the wired communication and the wireless communication and a connection request from the another external device is received via the other of the wired communication and the wireless communication;
 transmitting a connection change state notification to the one external device when the connection destination is switched to the another external device by the switching, the connection state change notification including a connection stop notification; and
 transmitting, after the connection destination is switched to the another external device by the switching and the one external device receives the connection stop notification, a connection restart notification to the one external device.

14. The non-transitory storage medium according to claim 13, wherein the switching switches the connection destination from the one external device to the another external device when the one external device is connected via the wireless communication and the connection request from the another external device is received via the wired communication.

15. The non-transitory storage medium according to claim 13, wherein the connection stop notification instructs the one external device to stop communication via the one of the wire communication and the wireless communication.

16. The non-transitory storage medium according to claim 15, wherein the method further comprises receiving image data, from the another external device via the other of the wired communication and the wireless communication, after transmitting the connection stop notification to the one external device.

17. The non-transitory storage medium according to claim 13, wherein the connection restart notification instructs the one external device to restart communication via the one of the wire communication and the wireless communication.

* * * * *